US008306747B1

(12) United States Patent
Gagarin et al.

(10) Patent No.: US 8,306,747 B1
(45) Date of Patent: Nov. 6, 2012

(54) TRAVEL WAY MEASUREMENT SYSTEM

(75) Inventors: Nicolas Gagarin, Kensington, MD (US); James R. Mekemson, Potomac, MD (US); Michael L. Scott, Kensington, MD (US); Milton K. Mills, Washington, DC (US); Morton S. Oskard, Potomac, MD (US)

(73) Assignee: Starodub, Inc., Kensington, MD (US)

( * ) Notice: Subject to any disclaimer, the term of this patent is extended or adjusted under 35 U.S.C. 154(b) by 1247 days.

(21) Appl. No.: 12/009,255

(22) Filed: Jan. 17, 2008

Related U.S. Application Data

(60) Provisional application No. 60/881,526, filed on Jan. 19, 2007.

(51) Int. Cl.
*G01S 13/88* (2006.01)

(52) U.S. Cl. ........ 701/514; 701/408; 701/409; 701/436; 701/439; 701/444; 701/468; 701/494; 701/500

(58) Field of Classification Search .................. 701/220, 701/221, 223, 225, 514, 448, 494, 540; 342/22; 73/146
See application file for complete search history.

(56) References Cited

U.S. PATENT DOCUMENTS

| 4,899,296 | A | * | 2/1990 | Khattak | 702/40 |
| 5,790,243 | A | * | 8/1998 | Herr | 356/5.1 |
| 6,035,053 | A | * | 3/2000 | Yoshioka et al. | 382/104 |
| 7,172,363 | B2 | * | 2/2007 | Olson et al. | 404/75 |
| 7,467,810 | B2 | * | 12/2008 | Leggatt | 280/789 |
| 2002/0122000 | A1 | * | 9/2002 | Bradley et al. | 342/22 |
| 2007/0104352 | A1 | * | 5/2007 | Yoshiguchi et al. | 382/104 |
| 2008/0039991 | A1 | * | 2/2008 | May et al. | 701/25 |

OTHER PUBLICATIONS

LeSchack & DelGrande; *A Dual-Wavelength Thermal Infrared Scanner as a Potential Airborne Geophysical Exploration Tool*; Geophysics, vol. 41, No. 6; Dec. 1976; pp. 1318-1336.
Maser, Kenneth; *Non-Destructive Measurement of Pavement Layer Thickness*; Infrasense, Inc.; Final Report Caltrans No. 65A0074; Apr. 25, 2003; pp. 91 Plus App. A. (6 pages).
Ibos et al.; *Infrared Emissivity Measurement Device: Principle and Applications*; Measurement Science and Technology, vol. 17, pp. 2950-2956; 2006; Institute of Physics Publishing; UK; 2006.
Harkey et al.; *Evaluation and Validation of Automated In-Vehicle Data Collection System for Developing Roadway Alignments*; Transportation Research Record: Journal of the Transportation Research Board, NRC; No. 1897; 2004; pp. 164-172.

* cited by examiner

*Primary Examiner* — Mary Cheung
*Assistant Examiner* — Jerrah Edwards
(74) *Attorney, Agent, or Firm* — James Creighton Wray

(57) ABSTRACT

A mobile platform, sensors mounted on the mobile platform, computers, data storage devices, power system, data acquisition hardware, and software form a Travel Way Measurement System. The mobile platform with sensors mounted within and upon it, moves along a surface travel way and records data to determine an accurate location and geometry of the travel way surface, surface features, transverse profile and features along side the travel way surface, structures, signs, and other features above the travel way surface, and utilities, pavement thickness and properties, pavement condition, and bridge deck properties and condition below the travel way surface. The mobile platform and sensors can travel and collect data at up to 60 miles per hour or more. The data acquisition hardware and software protocols permit the synchronization of all the sensor outputs in the temporal and spatial domain or in any other domain resulting from numerical transformation of sensor outputs.

28 Claims, 28 Drawing Sheets

PLAN VIEW DETAIL: DEFINITION OF CONTROL LINE (CL)

THE VEHICLE TRAJECTORY, PAVEMENT MARKING RECOGNITION RESULTS, AND ROAD GEOMETRY ARE FUSED TO DEFINE A CONTROL LINE

ESTIMATING VERTICAL ALIGNMENT USING MEASURED PROFILE

ESTIMATING VERTICAL ALIGNMENT USING MEASURED PROFILE

NOTE THAT A PLAN VIEW OF THE GPR RESULTS CAN BE GENERATED WITH THE ELEVATION PLOTS AND CROSS-SECTIONS.

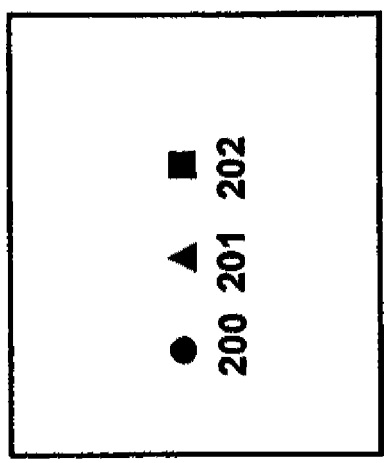
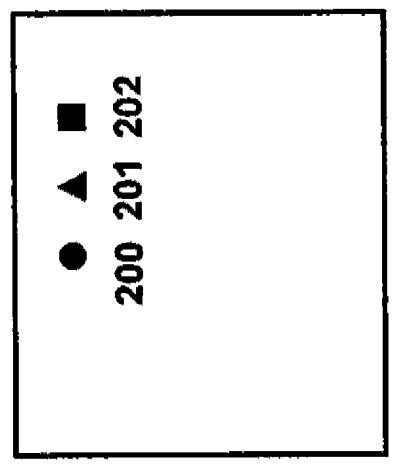
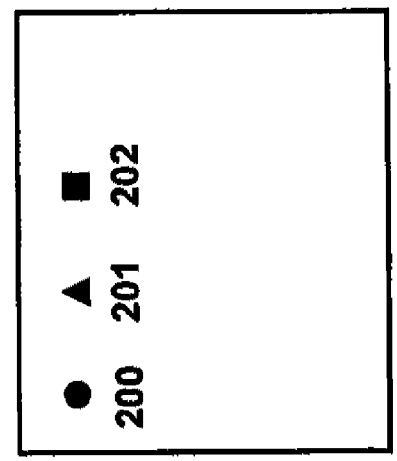
FIG. 26 ically improved data sampling) while reducing the risk
TRAVEL WAY MEASUREMENT SYSTEM This application claims the benefit of U.S. Provisional Application No. 60/881,526 filed Jan. 19, 2007.

This invention was made with Government support under Contract DTFH61-00-C-00076 awarded by the Department of Transportation. The Government has certain rights in this invention.

BACKGROUND OF THE INVENTION

Engineering measurements of transportation corridors such as highways, railways, airport runways and others and complementary measurements for asset management are important to providing safe, efficient transportation. The speed, accuracy and reliability available to generate these measurements are currently inadequate to meet the evolving engineering, safety and asset management needs of federal, state, and local transportation agencies as well as other entities. Specific characteristics of the measurements required include accurate three-dimensional position referencing synchronized with accurate measurements of transportation corridor elements. A need therefore exists to collect and generate engineering and asset management data using an innovative, comprehensive and cost effective measurement system. The system needs to measure features along the transportation corridor that are on, over, adjacent to and under the travel path.

A need exists for an apparatus, method and integrated system for accurately measuring transportation corridor geometry and asset presence, location and condition. The measurements are collected using a mobile vehicle platform. This provides required measurement data, (including substantially improved data sampling) while reducing the risk and cost due to manual field data collection and minimizing traffic interference.

SUMMARY OF THE INVENTION

The apparatus includes a mobile platform, sensors mounted on the mobile platform, computers, data storage devices, power system, data acquisition hardware, and software.

The mobile platform with sensors mounted within and upon it, moves along a surface travel way and records data to determine an accurate location and geometry of the travel way surface, surface features, transverse profile and features along side the travel way surface, structures, signs, and other features above the travel way surface, and utilities, pavement thickness and properties, pavement condition, and bridge deck properties and condition below the travel way surface. In its basic operating mode, the mobile platform and sensors can travel and collect data at up to 60 miles per hour or more.

The mobile platform described in this document is a van and together with the other apparatus and software is called the Travel Way Measurement System (TWMS) or Digital Highway Measurement System (DHMS) and is directly applicable to other travel ways including but not limited to railways, runways, or any other travel surface in addition to highways.

The system embodied by the TWMS/DHMS uses apparatus and methods that permit the measurement and positioning of the travel way and travel way assets to a degree of accuracy not previously attained from a mobile platform and especially from a mobile platform traveling at highway speeds.

Uniqueness of apparatus and methods is in its position referencing, synchronization of sensors, completeness of sensor data used to generate outputs, and minimizing the number of computers for greater control and synchronization. The system concept and implementation is applicable to other travel ways such as railways, runways, and travel way surfaces other than highways. The data acquisition hardware and software protocols permit the synchronization of all the sensor outputs in the temporal and spatial domain (or in any other domain resulting from numerical transformation of sensor outputs).

The fusion and calibration of sensor groups permit measurement and integration of travel way assets and properties not previously obtained from a mobile platform traveling at highway speeds. Recording of the vehicle trajectory at a high level of accuracy in combination with sensors to measure vehicle wander (lateral position within lane) are key components in three dimensional reconstruction of the travel way. Accurate measurement of pavement cross slope and pavement grade at highway speeds using a combination of sensors is also critical to the eventual three dimensional reconstruction of the travel way. The combination of the TWMS/DHMS location and positioning capabilities the SF GPR operational methods employed and additional sensors for maintaining precise SF-GPR positioning relative to the pavement surface provide accurate location and position referencing along with higher resolution measurements on a mobile platform. Redundancy of sensors and types of sensors for critical measurement elements helps ensure the identification and location of the various assets. Such is the case for the scanning laser used in identifying travel way features by their shape and measurements and the video cameras for stereoscopic imaging of the same assets.

The data reduction and integration functions take advantage of the fusion of synchronized sensor data to generate accurate location, positioning, and measurement of travel way assets and features. Sensors used by the TWMS/DHMS system are described under Apparatus. Methods that describe what sensors are used for the various processing and integration functions are described under Methods. FIGS. 1A and 1B presents the DHMS Functional Flow Chart that shows the general sequence of data flow amongst the functions.

All functional outputs are time and/or location referenced to permit these outputs to be combined in many ways for visualization/simulation, plan and elevation drawings, cross sections including under ground features, and for asset management, asset evaluation, and engineering analysis. The combined data can also be passed to third party Cad, GIS, and engineering software packages for subsequent usage.

Vehicle trajectory is derived from a method using a combination of measurement apparatus including commercial aircraft quality six degrees of freedom Inertial Navigation Unit (INU) (FAA RNP-10 unaided for 12.5 hours) that is based on a ring laser gyroscope (or better) and internal accelerometers for recording of vehicle attitude and acceleration along three axes and a distance measurement instrument (DMI) mounted on the vehicle.

The system, apparatus and methods are used to establish a comprehensive three dimensional reconstruction of the road, roadside, overhead features, and below ground features. The methods are based on using measurement devices of high accuracy and redundancy to temporally and spatially fuse the data or in any other domain resulting from numerical transformation of sensor outputs. Fusion of the sensor or sensor system data begins at the apparatus level where sensor control and data acquisition is performed by the primary computer. Complex sensor systems such as the Step Frequency Ground Penetrating Radar (SF GPR) are controlled by their own computer but are temporally and spatially linked to the primary computer for full synchronization of sensor data.

Vehicle trajectory is derived from a method using a combination of measurement apparatus including commercial aircraft trans-oceanic flight quality Inertial Navigation Unit (INU) that is based on a ring laser gyroscope (or better) and internal accelerometers for recording vehicle attitude along three axes and a distance measurement instrument (DMI) mounted on the vehicle. INU compass headings are filtered to remove quantization errors, INU pitch angle, and DMI measurements are used to compute vehicle trajectory. The accuracy of the method using the commercial aircraft trans-oceanic flight quality Inertial Navigation Unit (INU) far exceeds current practice of GPS location as primary location reference and its related error problems along with its far less accurate INU supplementing location information when GPS signals deteriorate.

Road geometry derived from a method using a combination of measurement apparatus including
1. commercial aircraft trans-oceanic flight quality Inertial Navigation Unit (INU) that is based on a ring laser gyroscope (or better) and accelerometers for recording of vehicle trajectory in three dimensions,
2. height displacement sensors mounted on the left and right side of the vehicle pointed at the travel surface for measuring vehicle roll relative to travel way cross slope,
3. height displacement sensors mounted on the rear and front of the vehicle pointed at the travel surface for measuring vehicle pitch relative to travel way grade,
4. scanning laser mounted on vehicle with scan performed in a transverse direction relative to vehicle longitudinal travel for measuring lane wander (lateral position within lane) by recognizing lane markings and/or lane edges relative to vehicle position,
5. video cameras for measuring lane wander (lateral position within lane) by recognizing longitudinal joints and/or pavement markings,
6. distance measurement instrument (DMI) mounted on vehicle, and
7. ground penetrating radar (GPR) for location of underground features.

Individual lane geometry methods include:
1. the use of the INU absolute pitch measurement and front and rear laser based vehicle pitch measurement relative to the travel way to determine absolute surface grade,
2. the use of the INU absolute roll measurement and the left and right laser based vehicle roll measurement relative to the travel way to determine absolute surface cross slope (cross fall, superelevation),
3. the use of the INU absolute roll measurement and the scanning laser mounted transversely to the vehicle longitudinal path to determine absolute surface cross slope (cross fall, superelevation),
4. the use of the scanning laser to measure lane wander (lateral position within lane) by recognizing lane markings via reflective signal strength and pattern recognition,
5. the use of the scanning laser to measure lane wander (lateral position within lane) by identifying lane edges by recognizing surface dimensional changes such as the junction of adjacent lanes with different cross slopes, edge drop off, curbs, unpaved shoulder's rough surface, or vegetation (high reflective signal strength) adjacent to travel lane,
6. the establishment of a lane control line to relate the above measurements, and
7. the accounting of lane wander, vehicle pitch relative to pavement, and vehicle roll relative to pavement to establish a three dimensional location and measurement of the travel lane at each measurement point for which horizontal and vertical alignment standard parameters can be extracted.

Road geometry is presented in three dimensions by assembling the individual lane geometries that include:
1. control points using roadside and/or travel surface markers (reflective tape) placed transversely to travel surface path at the ends of the project site and within the project site,
2. control points defined by recognizable features across all lanes from sensor data such as major surface texture changes, expansion joints at bridges, diverging/converging lane markings for adjacent opposing traffic lanes, pavement reflectivity difference at concrete and asphalt pavement transitions, pavement temperature difference at concrete and asphalt pavement transitions, and underground features,
3. lane geometry control points such as the transitions from tangent to curves and curves to tangents,
4. establishment of a road control line to relate all control points and measurements, and
5. control line and control points used to combine data into a three dimensional representation of the road and roadside.

From this road geometry data, plan, elevation and cross section drawings are generated. Three dimensional renderings and simulations also are generated. Cross section data includes ground penetrating radar identified features.

Three dimensional roadside geometry results from integrating the roadside offset and height information relative to the vehicle measured with the scanning laser to the outside lane edge of the road or other control line.

Overhead features, tunnels, overpass, sign structures, location and clearance measurements to integrate offset and height information relative to the vehicle measured with the scanning laser to a control line.

All measurements are related to an established coordinate system such as state plane coordinates or a project established coordinate system. Static GPS measurements are used to relate control points to state plane coordinates or when no other location reference is available.

Pavement marking identification and location use a scanning laser mounted on vehicle with scan performed in a transverse direction relative to vehicle longitudinal travel include:
lane marking where reflective signal strength for markings that are greater than underlying pavement,
lane marking location expectancy relative to vehicle, other markings,
lane marking pattern matching such as single lines, double lines, dashed lines, solid lines, and diverging lines,
identification of markings in adjacent lanes when lane markings are in good condition,
successive scan data of pavement markings along with longitudinal distance data to further identify, locate, and confirm in the longitudinal and transverse dimensions the pavement markings such as solid, dashed, single and double lane markings.

Edge of lane or pavement identification and location methods using a scanning laser include:
comparing lane and adjacent lane (or shoulder) cross slope as measured by the scanning laser for common lane edge, identification and location of edge of pavement using a scanning laser by measuring roughness of roadside next to pavement via numerical method of Mean Square Error for a short regression line or absolute sum about short regression line, identification and location of edge of pavement using a scanning laser by measuring high reflective signal strength of vegetation relative to pavement, identification and location of edge of pavement using a scanning laser by measuring large change in reflective signal strength from pavement to differing ground material, identification and location of edge of pavement using a scanning laser by measuring edge drop off, identification and location of edge of pavement using a scanning laser by comparing lane and shoulder cross slope difference as measured by the scanning laser, identification of lane edge using longitudinal lane joint recognition using a scanning laser data reflective signal strength drop relative to surrounding pavement, and successive scan data of pavement markings along with longitudinal distance data to further identify, locate, and confirm in the longitudinal and transverse dimensions lane and pavement edges.

Pavement edge drop-off identification and location methods use a scanning laser to measure shoulder profile in terms of drop depth and width along edge of pavement.

Curb identification and location methods use a scanning laser to measure curb offset and height profile pattern matching of vertical faced, slanted face, and rounded face curbs. Successive scan data of curbs along with longitudinal distance data to further identify, locate, and confirm the presence of curbs in the longitudinal and transverse dimensions.

Guardrails, barriers, and flat-board fences identification and location methods use a scanning laser to measure feature offset and height profile pattern matching. Guardrail types can be further identified by the vertical face pattern including timber, W-Beam, Thrie-Beam, and others. Successive scan data along with longitudinal distance data to further identify, locate, and confirm the presence of guardrails, barriers, and flat-board fences in the longitudinal and transverse dimensions.

Other vertical face shapes identification and location methods use a scanning laser to measure feature offset and height profile pattern matching. Successive scan data of vertical face shapes along with longitudinal distance data to further identify, locate, and confirm the presence of continuous vertical surfaces in the longitudinal and transverse dimensions. Vertical surfaces can be attributable to bridge walls, retaining walls, sound walls, buildings, and other similar vertical faced objects.

Cross street and driveway identification and location methods use a scanning laser include:

identification and location of intersecting street corner radii from curb, edge of pavement, and/or lane markings identification, identification and location of smoothed surfaces (paved) leading away from pavement surfaces, and identification and location of missing lane marking(s) in the longitudinal direction at the intersection of a cross street or driveway.

Vertical clearance measurement method use a scanning laser to measure offset and height profile of overhead structures such as tunnel roofs, underside of overpasses, underside of large overhead sign structures, and other large overhead structures.

Drainage low point identification and location method use a scanning laser measuring offset and height profile along side road.

Longitudinal joints in concrete pavements are initially highlighted in an image using a standard edge/line detection method. Longitudinal joints are identified as longitudinal joints appearing darker than the surrounding pavement. The longitudinal joint detection is further refined by location as to expected geometry relative to the viewpoint of the cameras. Second method uses a single horizontal scan line from the image where the longitudinal joint appears darker within the single scan line within a viewing area of expectancy of where the joint is expected to exist. Successive joint recognition along the single image scan line along with longitudinal distance data may be used to further identify, locate, and confirm in the longitudinal and transverse dimensions the presence of longitudinal joints. Features recognized and measured via image processing are located in three dimensions relative to the vehicle using stereoscopic techniques and are then located relative to the roadway given the precise location and attitude of the vehicle relative to the road geometry as established in the Apparatus and Geometry Claims.

Guardrails and barriers are initially identified in an image using a standard edge/line detection method and then further identified given typical dimensions and location off the travel lane. Guardrail and barrier recognition using successive images further identify, locate, and confirm in the longitudinal and transverse dimensions their presence. Guardrails and barriers recognized and measured via image processing are located in three dimensions relative to the vehicle using stereoscopic techniques and are then located relative to the roadway given the precise location and attitude of the vehicle relative to the road geometry. This data may be combined with the scanning laser apparatus and methods to further verify the identity, location, and dimensions of the guardrail/barrier.

Guardrail and barrier end treatments can be identified and located using pattern recognition knowing the approximate end location of the guardrail within the image and the type of end treatments that exist that define the patterns to be matched. Guardrail and barrier end treatment recognition using successive images further identify, locate, and confirm their presence in the longitudinal and transverse dimensions. Guardrail and barrier end treatments recognized and measured via image processing are located in three dimensions relative to the vehicle using stereoscopic techniques and are then located relative to the roadway given the precise location and attitude of the vehicle relative to the road geometry.

Edge of pavements are initially identified in images using a standard edge/line detection method and then further identified by pattern recognition, pattern differences, and location and dimensional expectancy. Location expectancy can be relative to vehicle location and other roadway feature location. This data may be combined with the scanning laser apparatus and methods to further verify the identity and location of the edge of pavement. Edge of pavement recognition using successive images further identify, locate, and confirm their presence in the longitudinal and transverse dimensions. Edge of pavement recognized and measured via image processing are located in three dimensions relative to the vehicle using stereoscopic techniques and are then located relative to the roadway given the precise location and attitude of the vehicle relative to the road geometry (as established in the Apparatus and Geometry Claims).

Shoulders are initially highlighted in an image using a standard edge/line detection method and then further identified by pattern recognition and location and dimensional expectancy. Location expectancy can be relative to vehicle location and other roadway feature location. This data may be combined with the scanning laser apparatus and methods to further verify the identity and location of the shoulders. Shoulder recognition using successive images further identify, locate, and confirm their presence in the longitudinal and transverse dimensions. Shoulders recognized and measured via image processing are located in three dimensions relative to the vehicle using stereoscopic techniques and are then located relative to the roadway given the precise location and attitude of the vehicle relative to the road geometry (as established in the Apparatus and Geometry Claims).

Sidewalks are initially highlighted in an image using a standard edge/line detection method and then further identified by pattern recognition and location and dimensional expectancy. Location expectancy can be relative to vehicle location and other roadway feature location. This data may be combined with the scanning laser apparatus and methods to further verify the identity and location of the sidewalks. Sidewalk recognition using successive images further identify, locate, and confirm their presence in the longitudinal and transverse dimensions. Sidewalks recognized and measured via image processing are located in three dimensions relative to the vehicle using stereoscopic techniques and are then located relative to the roadway given the precise location and attitude of the vehicle relative to the road geometry (as established in the Apparatus and Geometry Claims).

Curbs are initially highlighted in an image using a standard edge/line detection method and then further identified by pattern recognition and location and dimensional expectancy. Location expectancy can be relative to vehicle location and other roadway feature location. This data may be combined with the scanning laser apparatus and methods to further verify the identity and location of the curbs. Curb recognition using successive images further identify, locate, and confirm their presence in the longitudinal and transverse dimensions. Curbs recognized and measured via image processing are located in three dimensions relative to the vehicle using stereoscopic techniques and are then located relative to the roadway given the precise location and attitude of the vehicle relative to the road geometry (as established in the Apparatus and Geometry Claims).

Raised surface markers are initially highlighted in an image using a standard edge/line detection method and then further identified by pattern recognition. Expected small size (relative to entire image) and repetition of markers progressing in the longitudinal direction (lane markers) or transverse direction (cross walks) are some of the recognition features. Raised surface markers recognition using successive images further identify, locate, and confirm their presence in the longitudinal and transverse dimensions. Location expectancy can be relative to vehicle location and other roadway feature location. Raised surface markers recognized and measured via image processing are located in three dimensions relative to the vehicle using stereoscopic techniques and are then located relative to the roadway given the precise location and attitude of the vehicle relative to the road geometry (as established in the Apparatus and Geometry Claims).

Cross streets and driveways are initially highlighted in an image using a standard edge/line detection method and then further identified by pattern recognition and location and dimensional expectancy. Cross streets and driveways recognition using successive images further identifies, locate, and confirm their presence in the longitudinal and transverse dimensions. Cross streets and driveways recognized and measured via image processing are located in three dimensions relative to the vehicle using stereoscopic techniques and are then located relative to the roadway given the precise location and attitude of the vehicle relative to the road geometry. This data is combined with the scanning laser apparatus and methods to further verify the identity, location, and dimensions of the cross streets and driveways.

Various engineering wall types such as retaining walls, sound walls, and others are initially identified in an image using a standard edge/line detection method and then further identified by pattern recognition, dimensional expectancy, and upright alignment. Engineering wall type recognition using successive images further identify, locate, and confirm their presence in the longitudinal and transverse dimensions. Engineering wall types recognized and measured via image processing are located in three dimensions relative to the vehicle using stereoscopic techniques and are then located relative to the roadway given the precise location and attitude of the vehicle relative to the road geometry.

Lane edge markings are initially identified in an image using a standard edge/line detection method and then further identified by their lighter appearance than the surrounding pavement and lane edge detection progressing from near the vehicle into the viewing direction. Lane edge marking types are further identified by their pattern of single or doubled line and solid or dashed lines. Lane edge markings recognition using successive images further identifies, locate, and confirm their presence in the longitudinal and transverse dimensions. Lane edge markings recognized and measured via image processing are located in three dimensions relative to the vehicle using stereoscopic techniques and are then located relative to the roadway given the precise location and attitude of the vehicle relative to the road geometry. This data may be combined with the scanning laser apparatus and methods to further verify the identity, location, and dimensions of the lane edge markings.

Pavement markings (other than lane edge markings and cross walks) are initially identified in an image using a standard edge/line detection method and then further identified by their shape and size. Pavement markings consisting of lettering and standard symbols can be further identified using optical character recognition. Pavement markings recognition using successive images further identifies, locate, and confirm their presence in the longitudinal and transverse dimensions. Pavement markings recognized and measured via image processing are located in three dimensions relative to the vehicle using stereoscopic techniques and are then located relative to the roadway given the precise location and attitude of the vehicle relative to the road geometry. This data may be combined with the scanning laser apparatus and methods to further verify the identity, location, and dimensions of the pavement markings.

Cross walks are initially identified in an image using a standard edge/line detection method, the transverse crossing of the lane/road pattern, and then further identified by their respective patterns based on type of cross walk marking. Cross walk recognition using successive images further identify, locate, and confirm their presence in the longitudinal and transverse dimensions. Cross walks recognized and measured via image processing are located in three dimensions relative to the vehicle using stereoscopic techniques and are then located relative to the roadway given the precise location and attitude of the vehicle relative to the road geometry. This data may be combined with the scanning laser apparatus and methods to further verify the identity, location, and dimensions of the cross walks.

Signs and sign posts are initially identified in an image using a standard edge detection method and then further identified by their shape (rectangular, diamond, octagon, triangular, etc) and size. Traffic signs are further identified via optical character recognition after the images have been deblurred, contrast adjusted, and rotated to remove character elongation. Sign recognition using successive images further identify, locate, and confirm their presence in the longitudinal and transverse dimensions. Signs recognized and measured via image processing are located in three dimensions relative to the vehicle using stereoscopic techniques and are then located relative to the roadway given the precise location and attitude of the vehicle relative to the road geometry.

Traffic signals are identified in an image using pattern recognition of traffic signal lenses shape, traffic signal head configurations and color matching of traffic signal lenses that are lit. Traffic signal recognition using successive images further identify, locate, and confirm their presence in the longitudinal and transverse dimensions. Signals recognized and measured via image processing are located in three dimensions relative to the vehicle using stereoscopic techniques and are then located relative to the roadway given the precise location and attitude of the vehicle relative to the road geometry.

Traffic signal poles and mast arms are identified in an image using pattern and edge detection recognition given the presence of traffic signals. Traffic signal pole and mast arm recognition using successive images further identify, locate, and confirm their presence in the longitudinal and transverse dimensions. Traffic signals poles and mast arms recognized and measured via image processing are located in three dimensions relative to the vehicle using stereoscopic techniques and are then located relative to the roadway given the precise location and attitude of the vehicle relative to the road geometry.

The DHMS position referencing technology is synchronized with a Step Frequency Ground Penetrating Radar (SF GPR) array of antennas mounted on the vehicle transverse to the direction of travel. Position information is used in a method to accurately determine the relative position of adjacent data collection runs for project sites where adjacent subsurface data sets are collected. Overlapping subsurface data is removed from adjacent runs using a method based on accurate position information. Remaining subsurface data from several individual adjacent runs is then fused together in three dimensions. Fused data is resampled on an established grid and three dimensional subsurface imaging calculations are performed for the features of interest.

Implement the Common Midpoint (CMP) material characterization technique in a method to use a SF GPR antenna array to measure GPR propagation velocities in materials, dielectric properties of materials, and thicknesses of materials. Relative to existing CMP methods, this method provides improved accuracy, (due to precise and known spacing of antenna array elements), convenience and speed. Successive pairs of antennas within the array, with increasing spacing increments, are rapidly interrogated to accurately measure the dielectric material properties of materials within milliseconds. The method can be used in a stationary location or while the vehicle is in motion. A new preprocessing method is performed on the collected data from the SF GPR antenna array in preparation for processing using standard methods.

A method of data marking and location referencing is implemented using metallic tape on the material surface being evaluated to form two dimensional letters, symbols, or codes as a data marking/referencing technique during the collection of subsurface data using a SF GPR antenna array. Migration, wavefield backpropagation or other subsurface imaging techniques may be used for post processing. Surface response data is analyzed using visual techniques or automated processing techniques to interpret markings and their position.

A method of selective SF GPR antenna array element utilization based on speed, resolution and signal processing requirements are used to maximize data sampling relative to vehicle acquisition speed and to enhance system resolution, including providing super-resolution capabilities. This super-resolution method provides sharper, more focused images than classical methods provide. Method uses combinations of transmitter and receiver pairs to efficiently and conveniently collect data for MUSIC signal processing implementation or other vector based array processing techniques (ESPRIT, Capon, etc.). A preprocessing method is performed on the collected data from the SF GPR array in preparation for the above signal processing implementations.

A method using data from selected SF GPR antenna array elements to perform "beamforming" for enhanced imaging resolution in localized areas.

The methods above allow for the use of fewer antenna elements and sparser sampling for high speed data collection and use additional antenna array elements for higher resolution if low speed and refined sampling are needed.

Measurement of pavement thermal emissivity using measurements in 2, 3 or more spectral ranges. The measurement methods are currently proposed for applications to asphalt pavements and are applicable to concrete pavement evaluation needs. The method fits the behavior to the appropriate curve, (among a family of thermal emissivity curves), in the process of making each thermal emissivity measurement.

The entire disclosure including the drawings and specifications of U.S. Pat. No. 7,142,952 filed Mar. 6, 2001 and issued Nov. 28, 2006 is incorporated by reference and set forth herein.

These and further and other objects and features of the invention are apparent in the disclosure, which includes the above and ongoing written specification, with the claims and the drawings.

BRIEF DESCRIPTION OF THE DRAWINGS

FIG. 26 is a diagram illustrating identical feature points collected from three different points of view.

DETAILED DESCRIPTION OF THE PREFERRED EMBODIMENTS

Figure 1A:
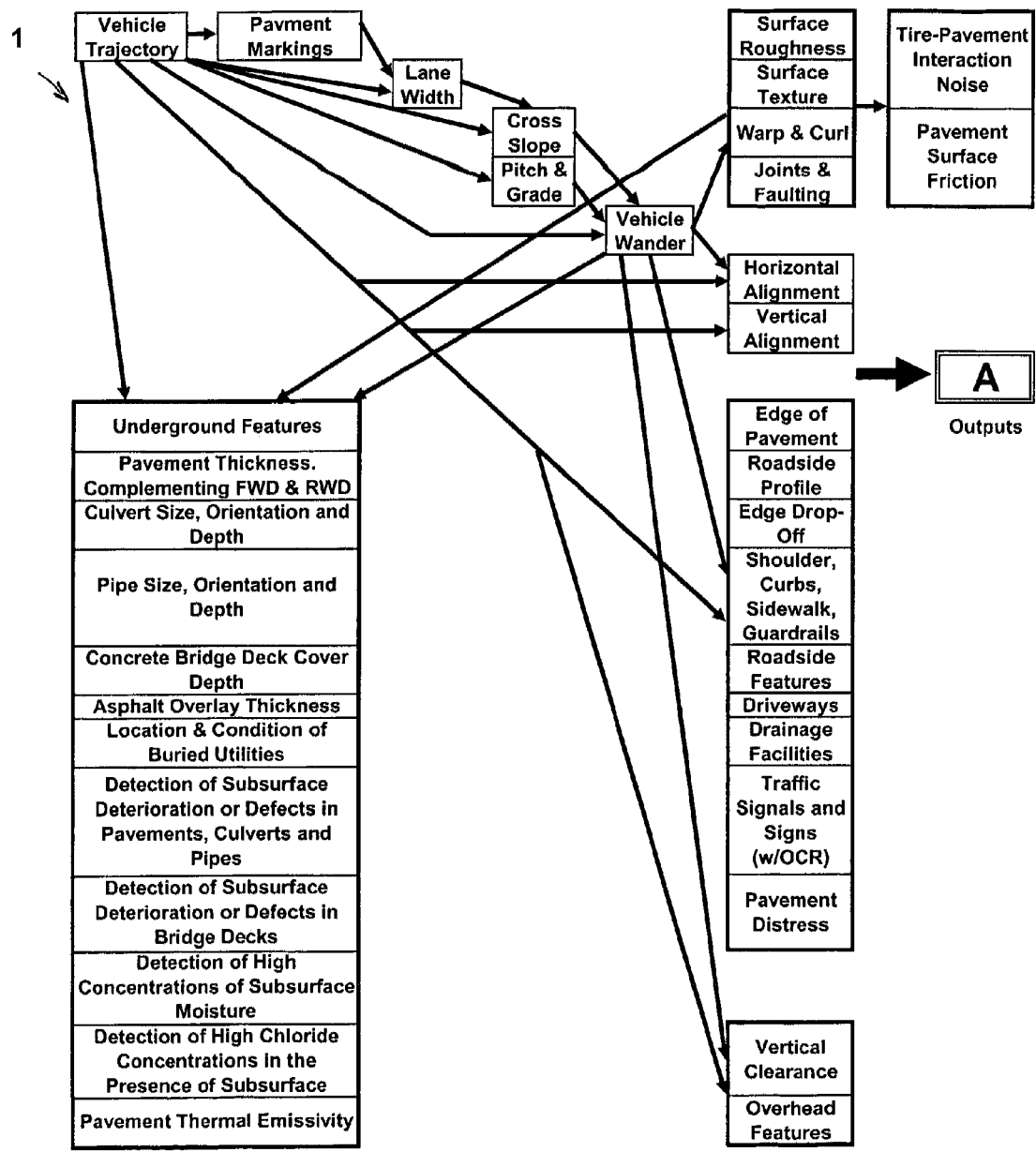
FIGS. 1A and 1B are Parts A and B of a Digital Highway Measurement System flow chart.
Figure 1B:
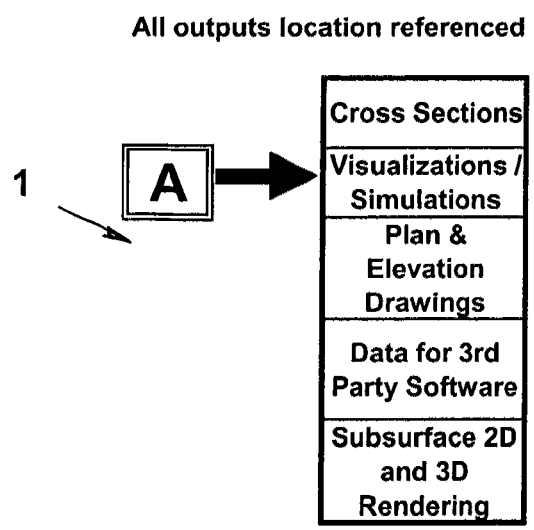

FIGS. 1A and 1B show a functional flowchart 1 of the method showing interrelationships of processing functions.

Figure 2:
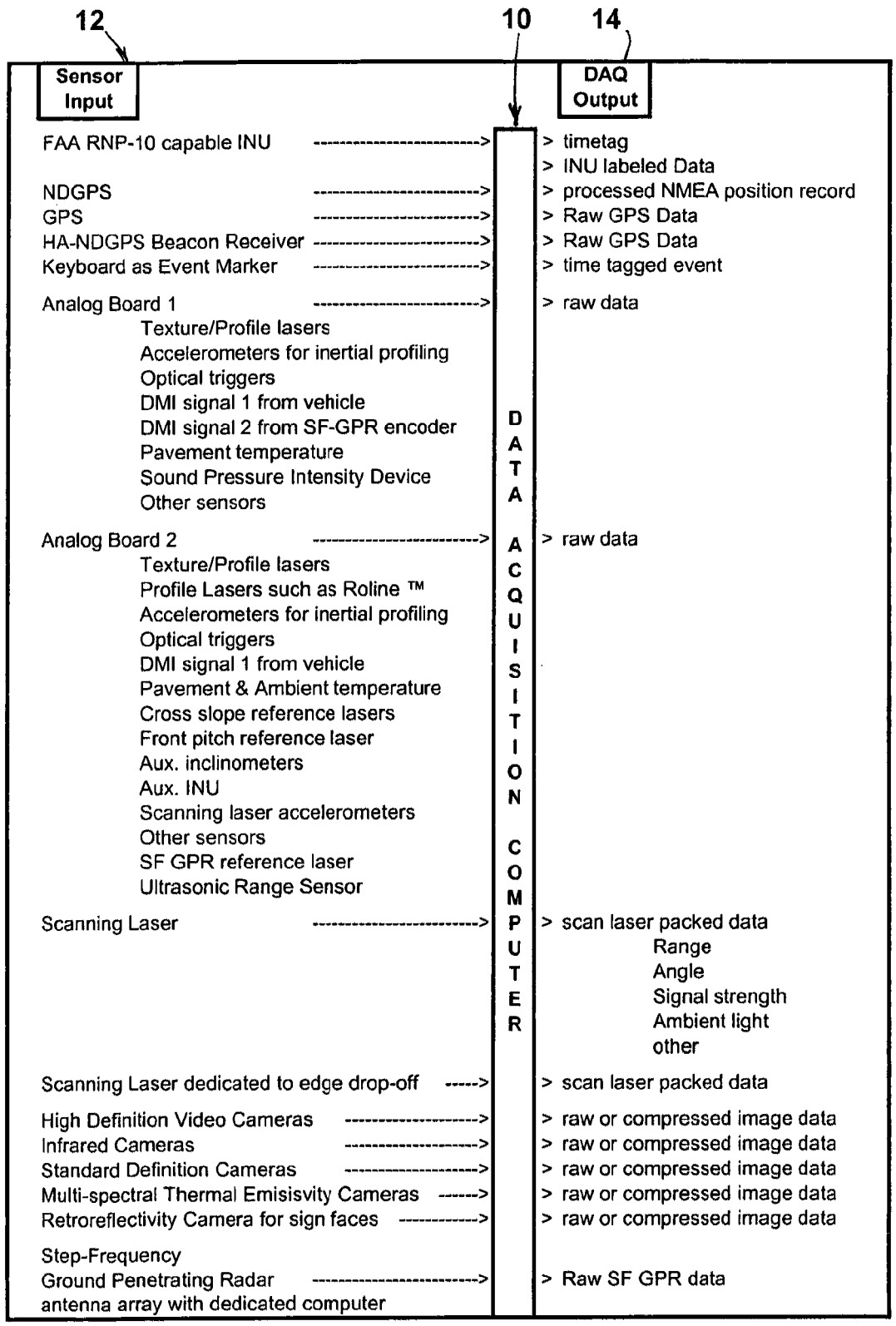
FIG. 2 shows data acquisition computer inputs and outputs.

FIG. 2 shows a data acquisition computer 10 with sensor inputs 12 to the computer 10 and data outputs 14 from the computer.

Figure 3:
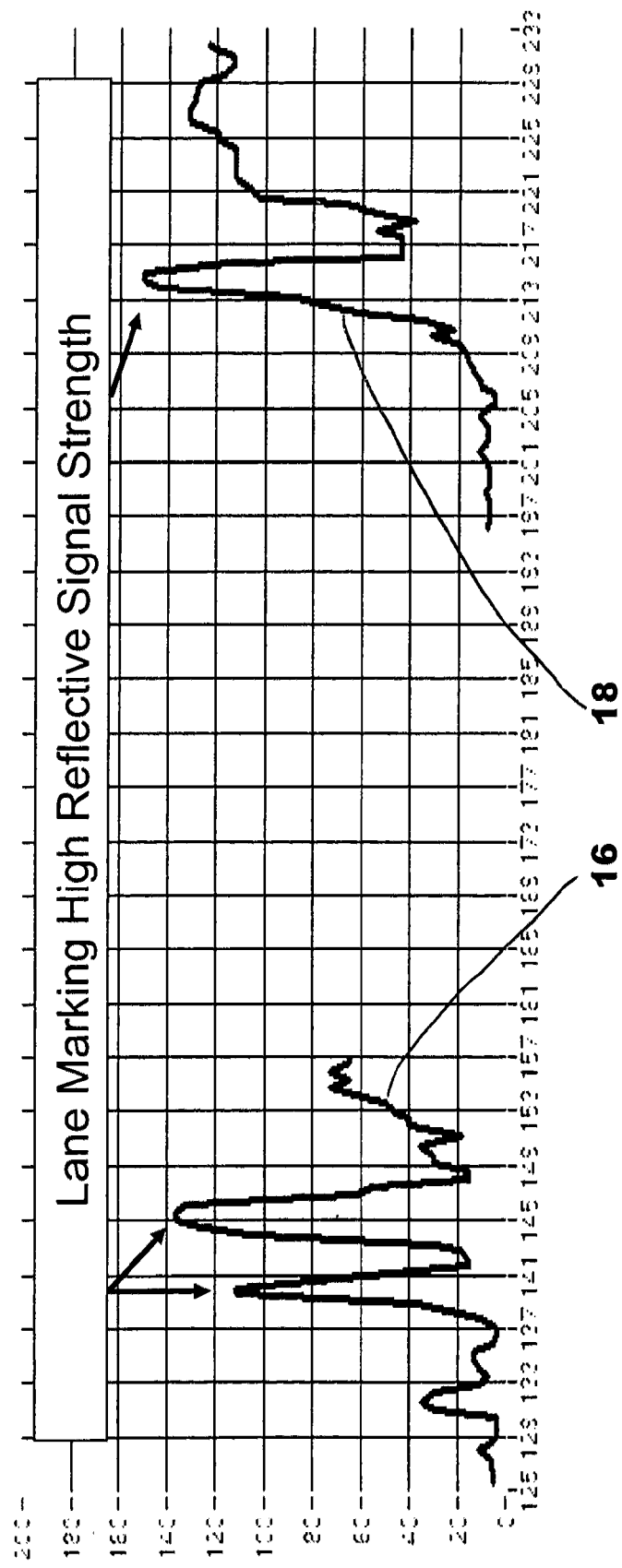
FIG. 3 shows lane marking high reflective signal strength.

FIG. 3 shows reflective laser signals 16 and 18 from lane markings to provide information of position of this vehicle in the lane of the travel way.

Figure 4:
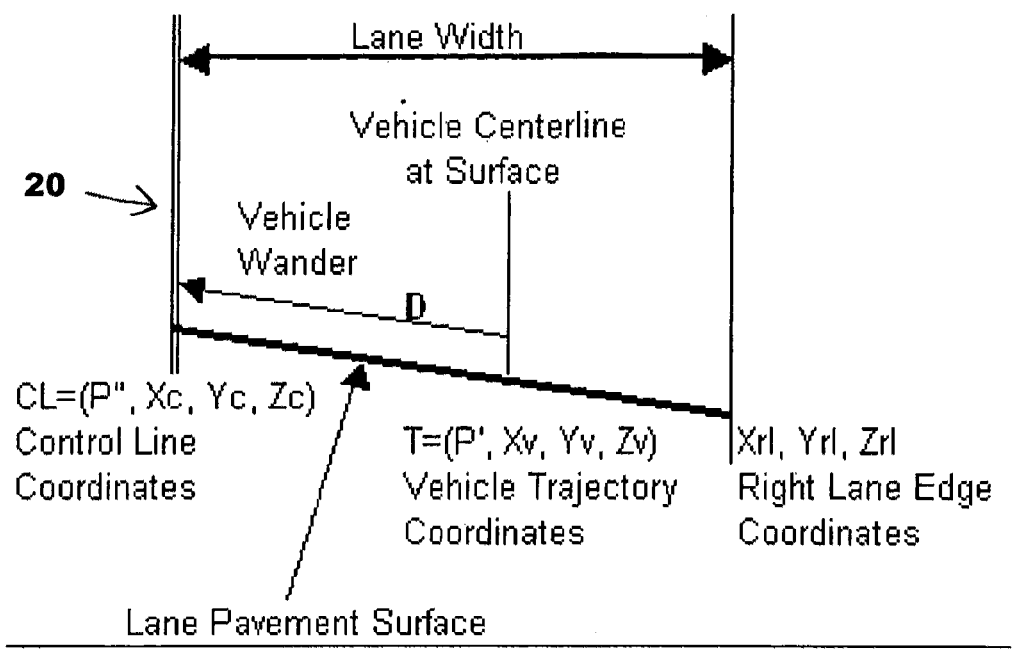
FIG. 4 shows measurement in a traffic lane.

FIG. 4 is a graph 20 of relationships of lane width, vehicle center line, wander and coordinates.

Figure 5:
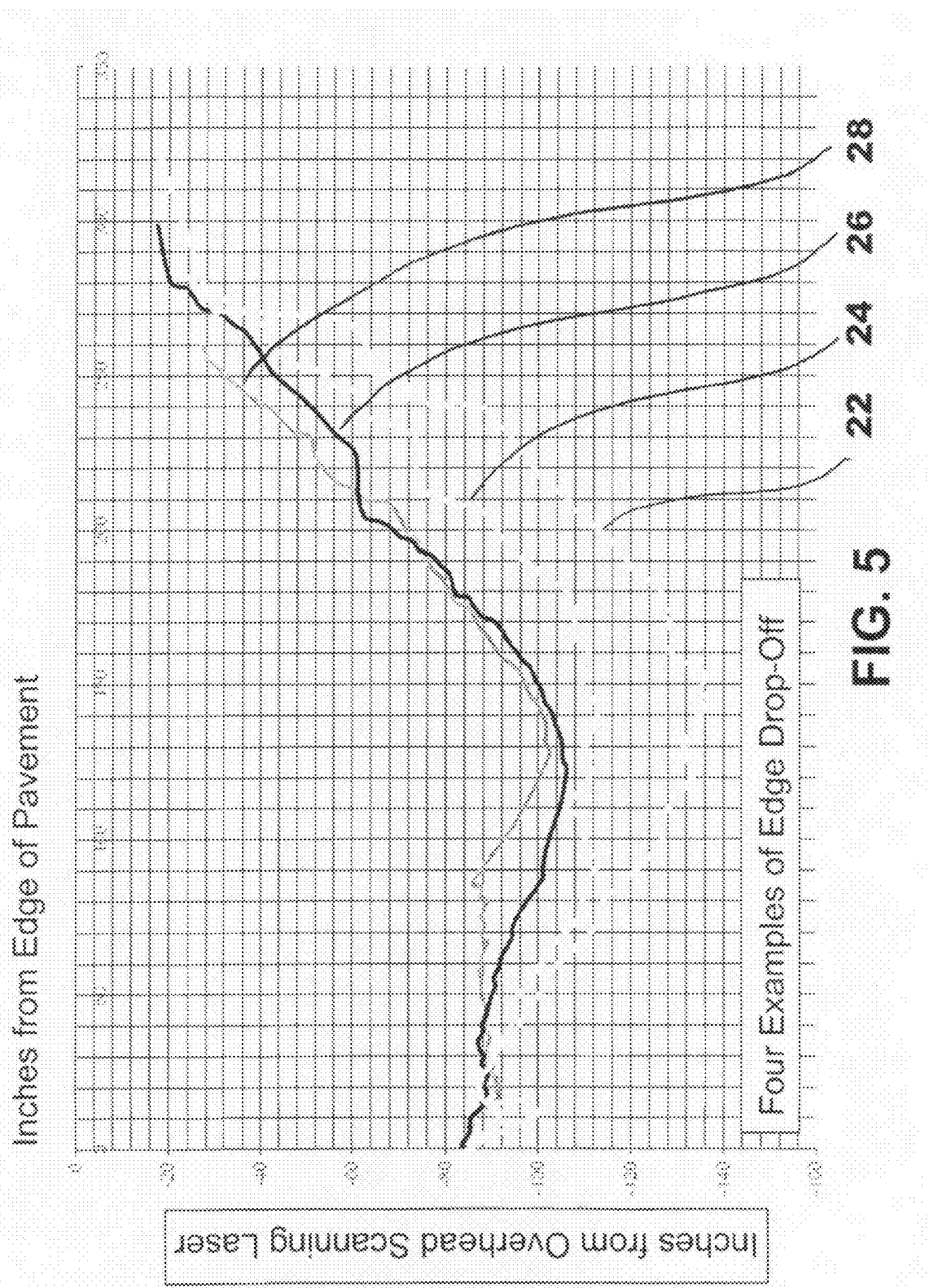
FIG. 5 shows four examples of edge drop-off.

FIG. 5 illustrates four examples 22, 24, 26, 28 of pavement edge drop offs.

Figure 6:
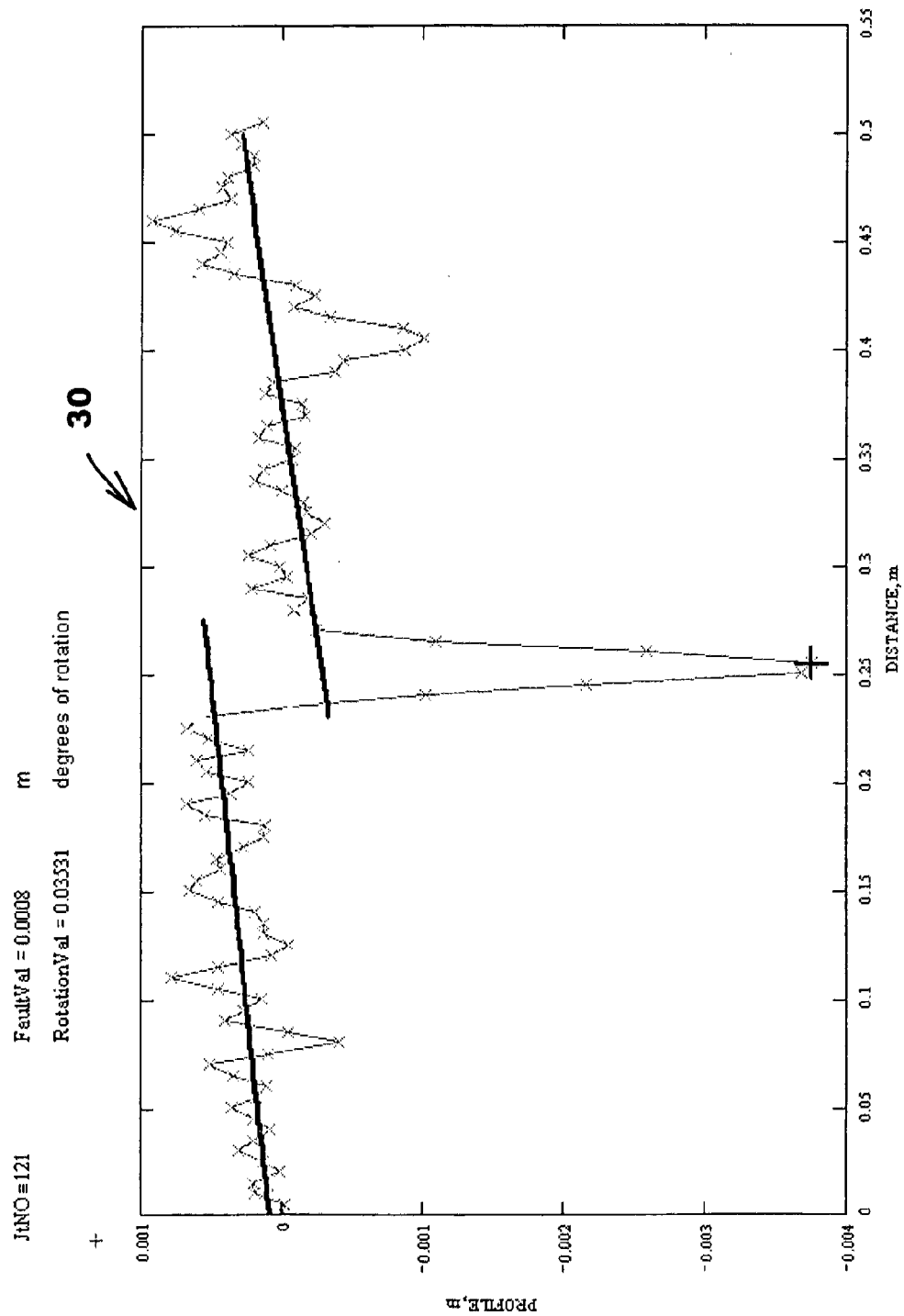
FIG. 6 is a graph of profile and distance relationships and method for measurement of pavement faults.

FIG. 6 is a graph 30 of profile and distance relationship for measurements of faults. Data points are taken by macro texture/inertial profile sensors. Lines are generated and the difference at overlaps is the size of the fault.

Figure 7:
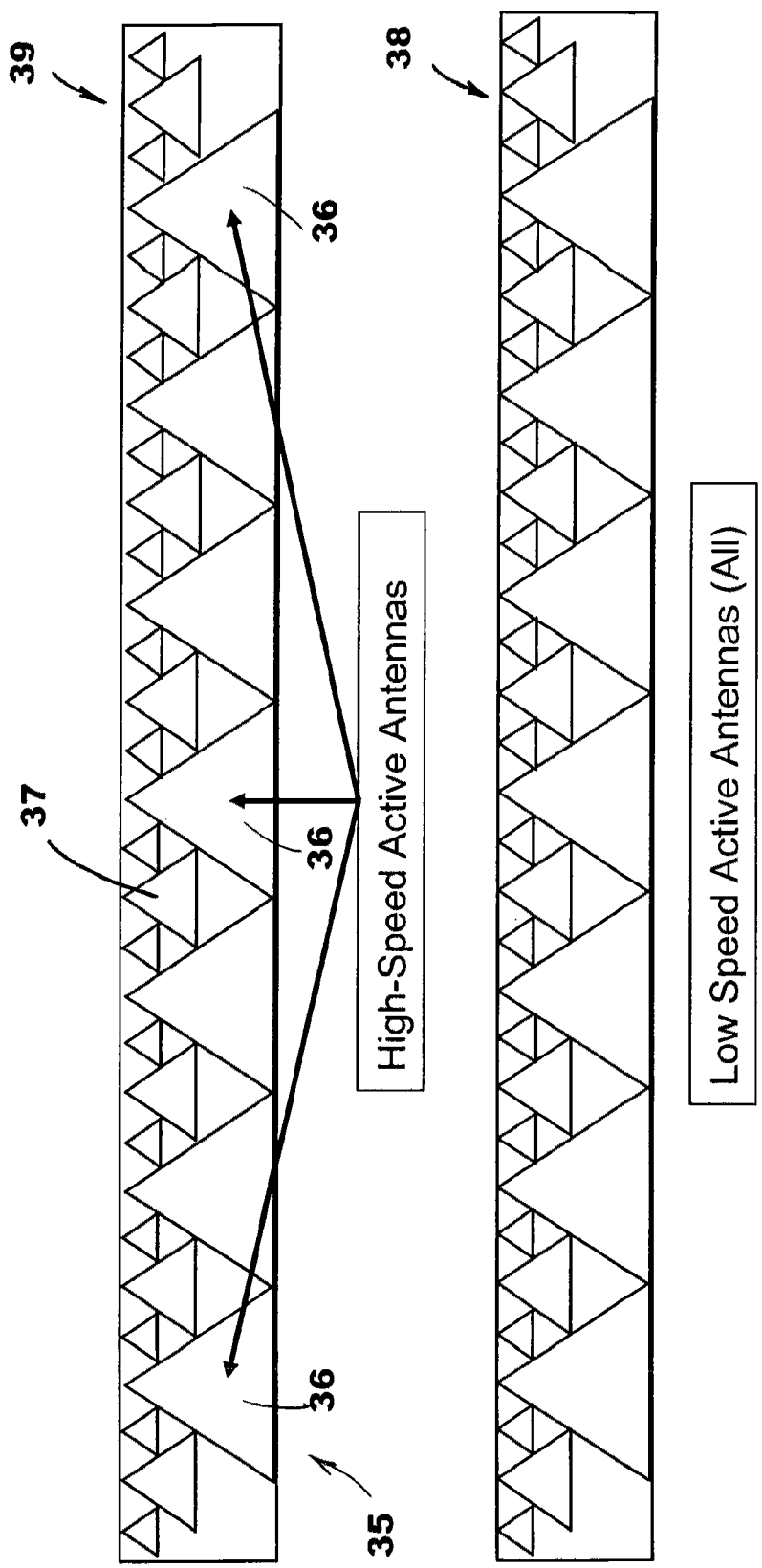
FIG. 7 shows antenna activation for high and low speeds in a ground penetrating radar (GPR) antenna array.

FIG. 7 schematically shows GPR antenna arrays 35 with enabled 36 and disabled 37 (shaded) antennas in low speed 38 and high speed 39 operations.

Figure 8:
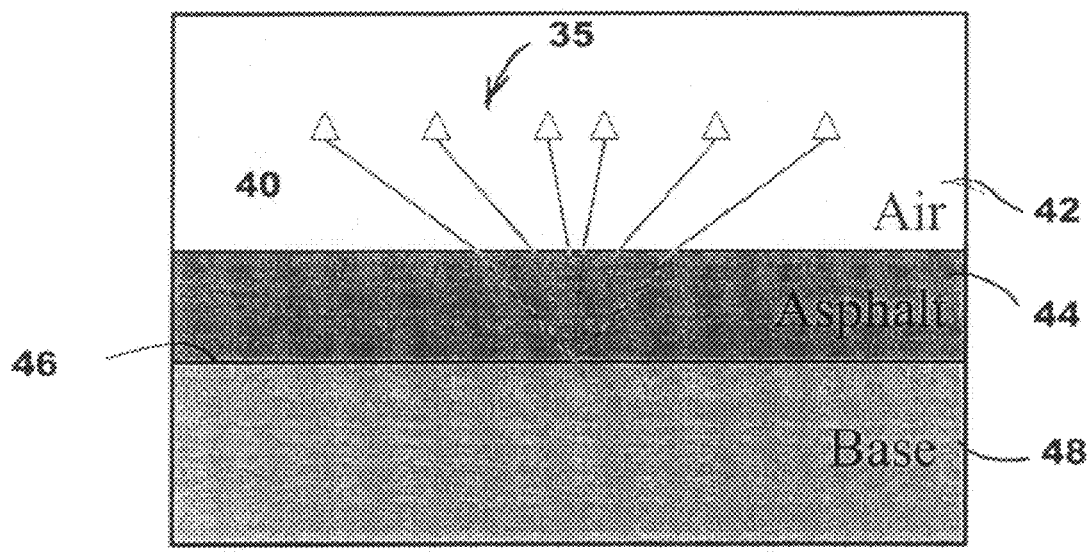
FIG. 8 schematically shows GPR paired antenna reflections.

FIG. 8 schematically shows rays 40 from GPR antenna array 35 extending through air 42, refracting through asphalt 44 and reflecting from an upper surface 46 of a base 48.

Figure 9:
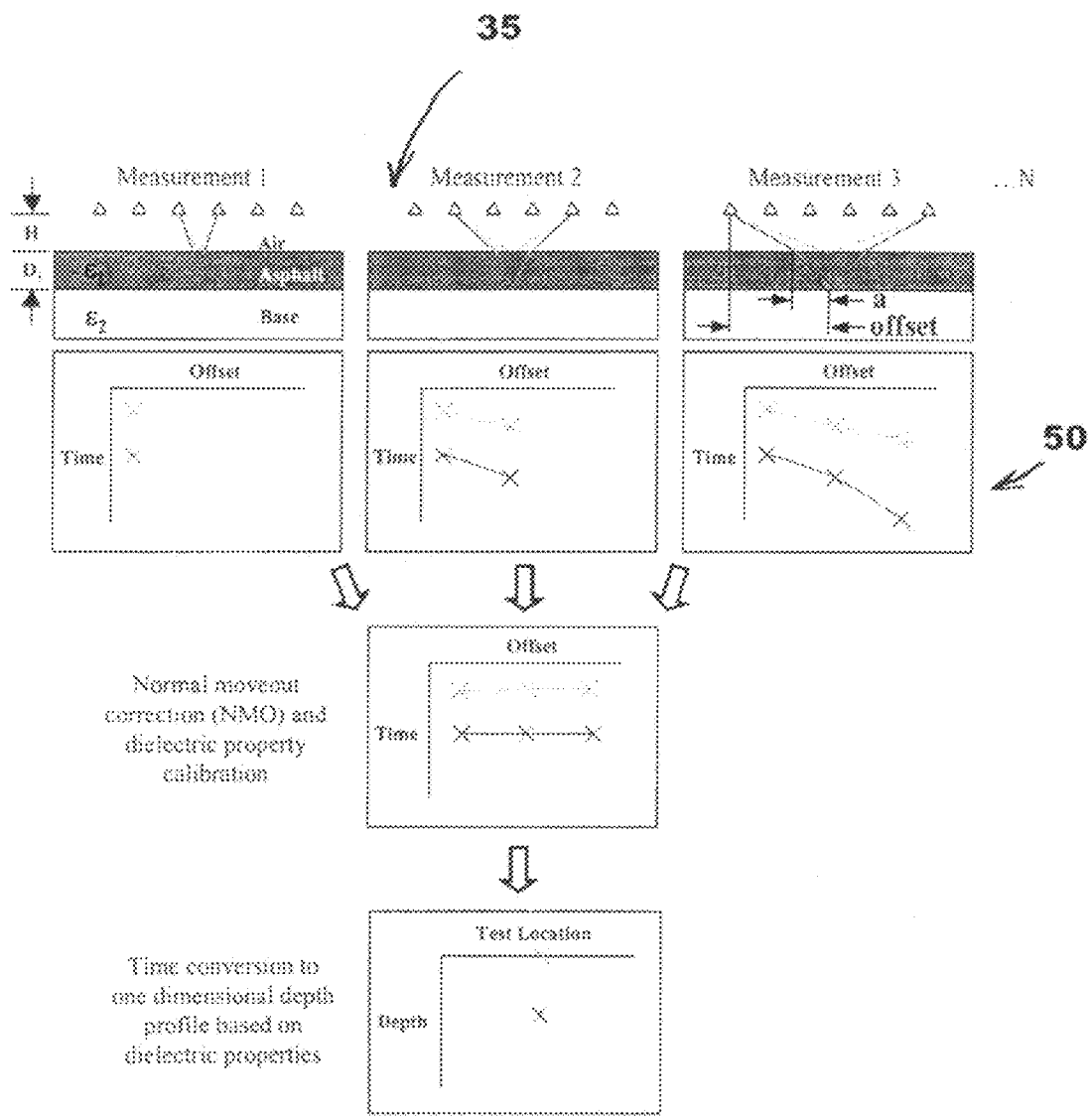
FIG. 9 shows GPR offsets and measurements.

FIG. 9 shows measurement by different antennas in the array 35 with stepped frequencies and indicated results of time and offset 50 with normal correction (NMO) and dielectric property calibration and time conversion to one dimensional depth profile based on dielectric properties.

Figure 10:
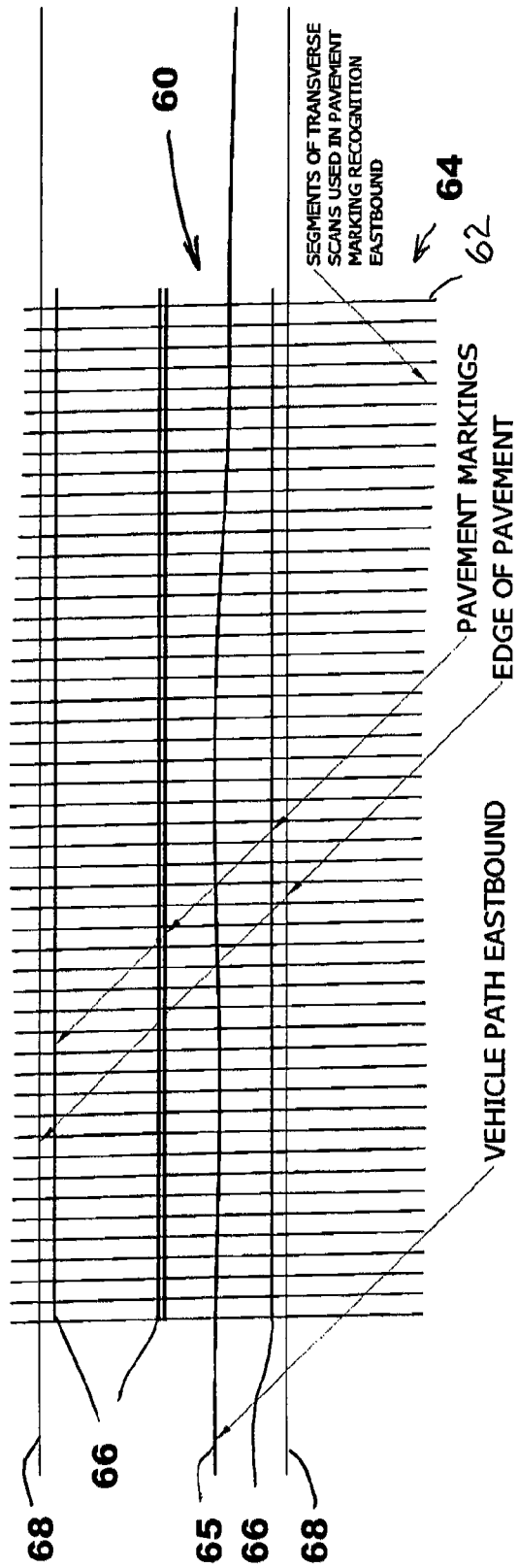
FIG. 10 shows that the vehicle trajectory, pavement marking recognition results, and road geometry are fused to define a control line for a lane.

FIG. 10 shows results of laser scanning as a vehicle moves in a path 65 eastbound segments 62 of transverse scans 64 are shown from left to right along the travel way 60. The scans reflect pavement markings 66 and the edges 68 of the pavement 66 along the travel way, which is a roadway.

Figure 11:
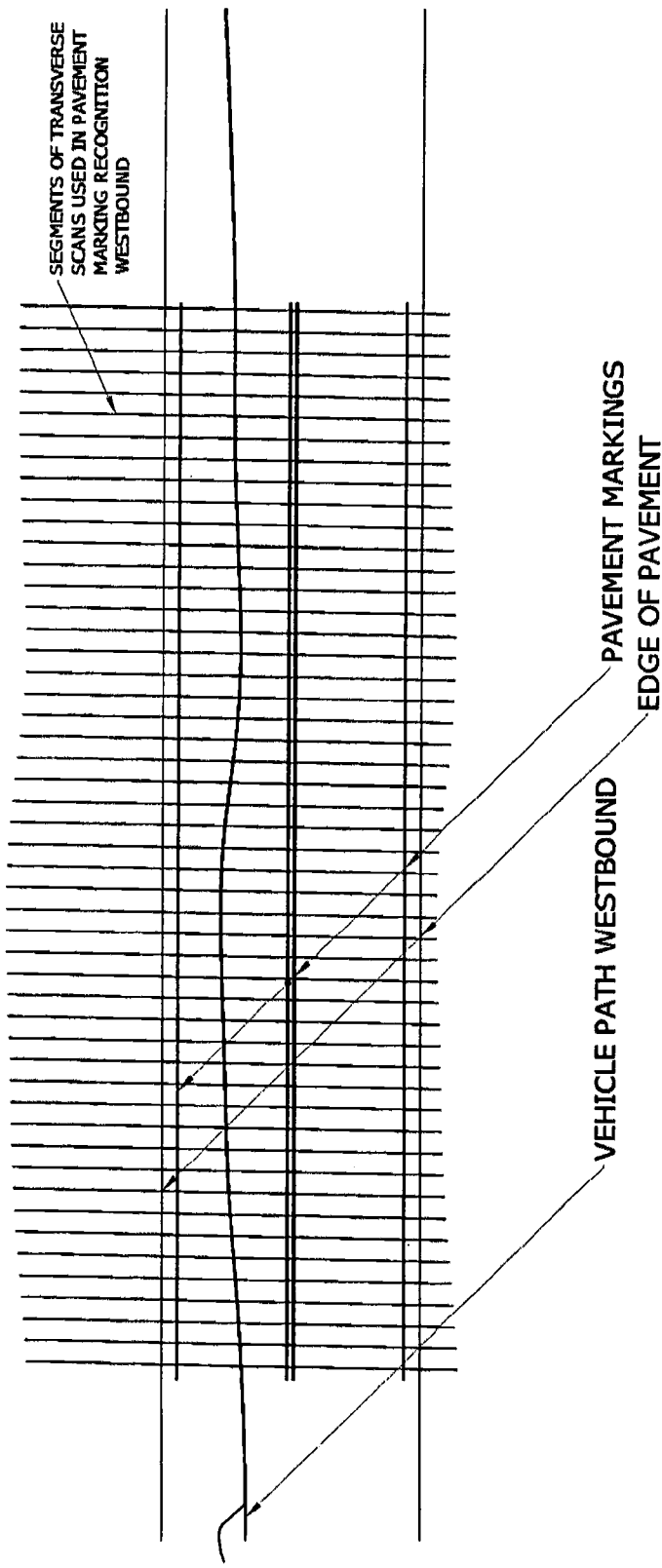
FIG. 11 shows that the vehicle trajectory, pavement marking recognition results, and road geometry are fused to define a control line.

FIG. 11 shows similar information for the westbound path 63 of the vehicle moving in a direction from left to right.

Figure 12:
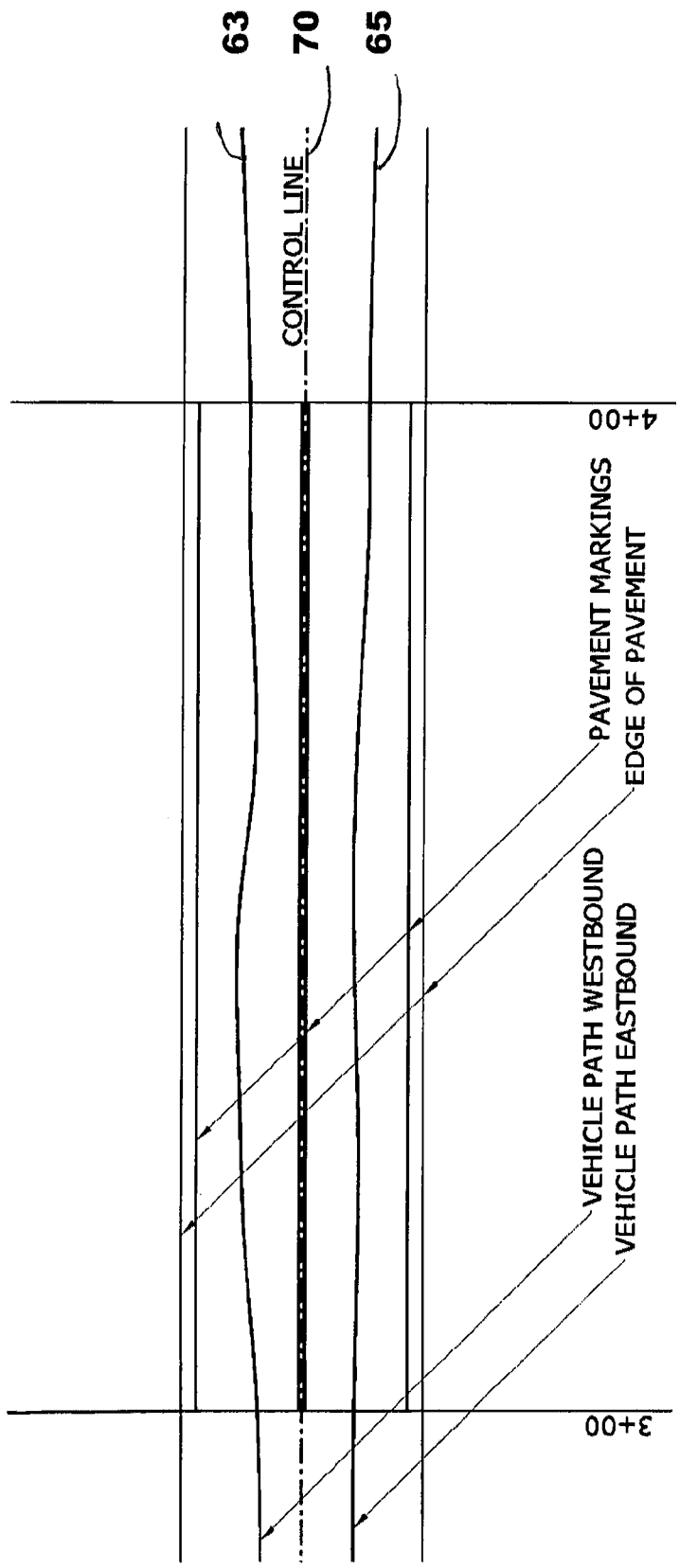
FIG. 12 shows that the vehicle trajectory, pavement marking recognition results, and road geometry are fused to define a control line for a road.

FIG. 12 is a plan detail of a control line 70 established for the vehicle moving in path 63 and 65 as shown in FIG. 11. The numbers next to the vertical lines represent measurements of feet along the control line. For example 3+00" represents 300 feet.

Figure 13:
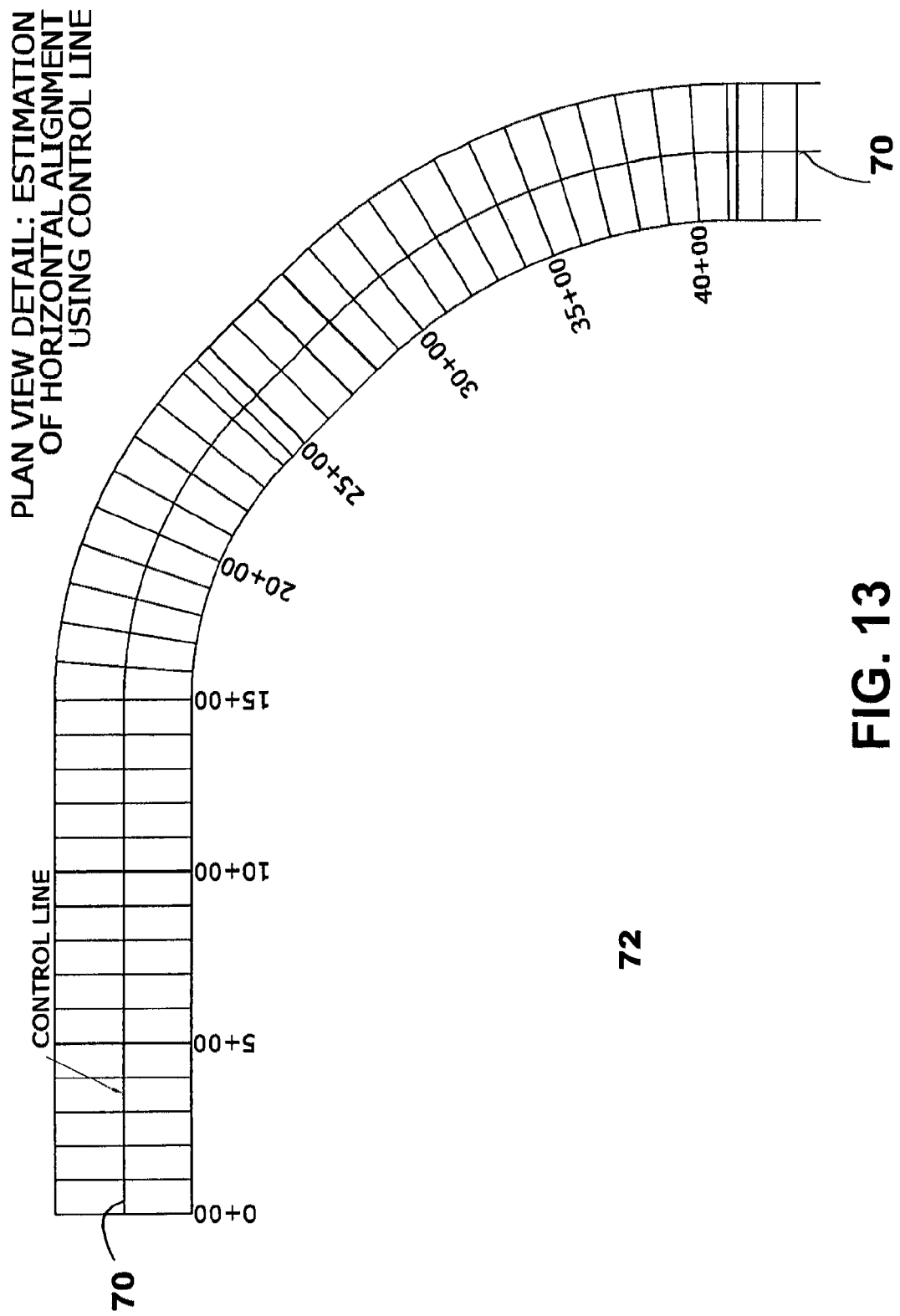
FIG. 13 shows a plan view detail: estimation of horizontal alignment using control line.

FIG. 13 is a plan view showing estimation of horizontal alignment 72 of a roadway along a control line 70.

Figure 14:
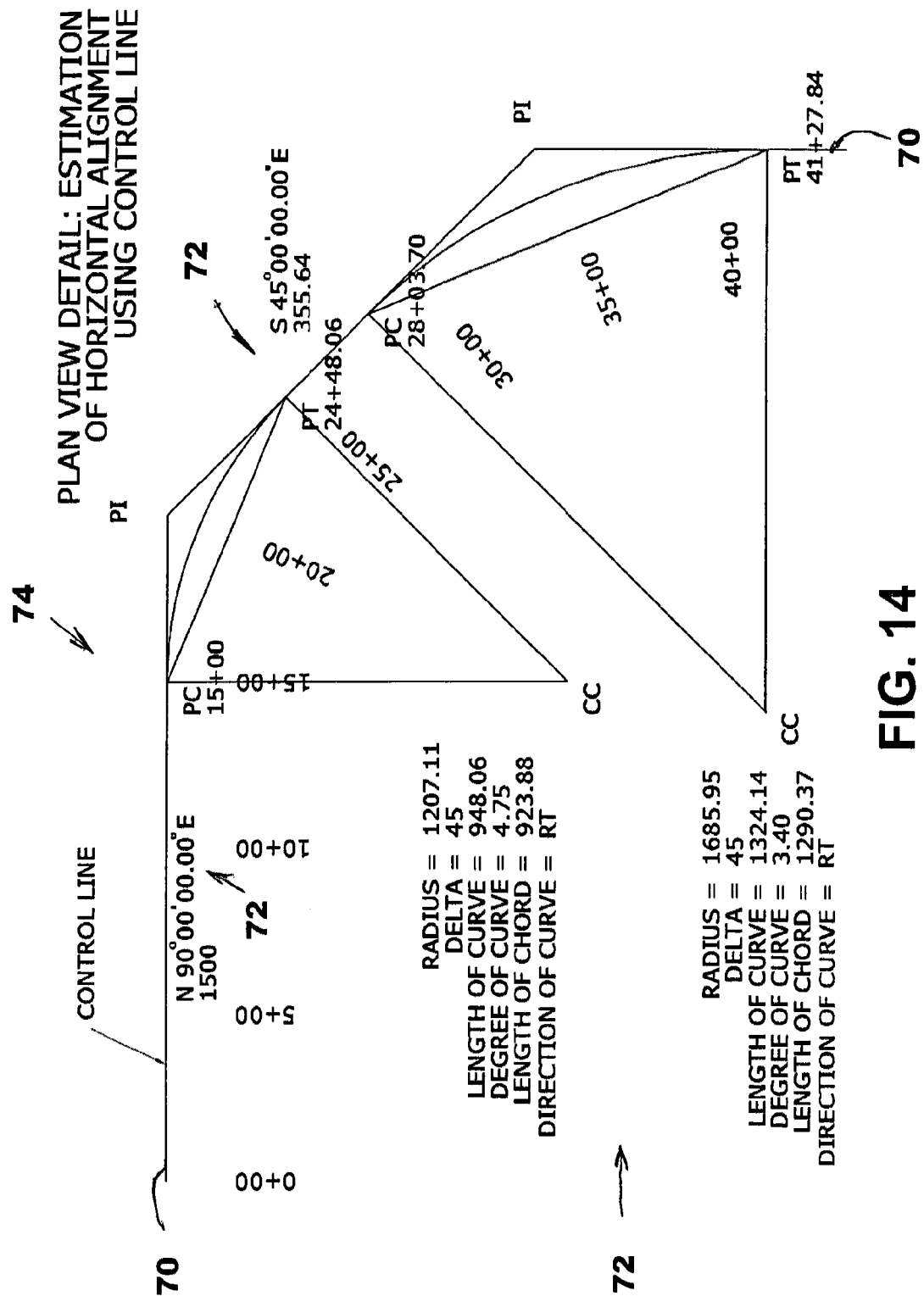
FIG. 14 shows a plan view detail: estimation of horizontal alignment using control line.

FIG. 14 is a developmental plan view 74 of points, lines, radii and centers of curvature along the control line 70.

Figure 15:
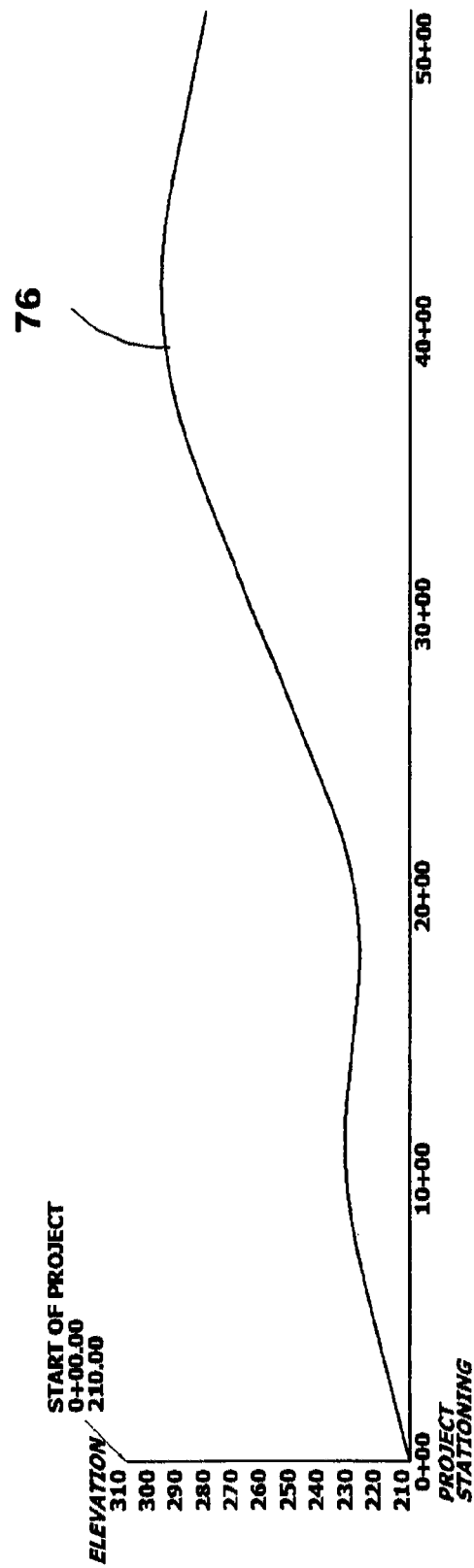
FIG. 15 shows a profile view estimating vertical alignment using measured profile.

FIG. 15 is an elevational plot 76 along control line 70 generated from the INU and other sensors. Numbers are shown in feet.

Figure 16:
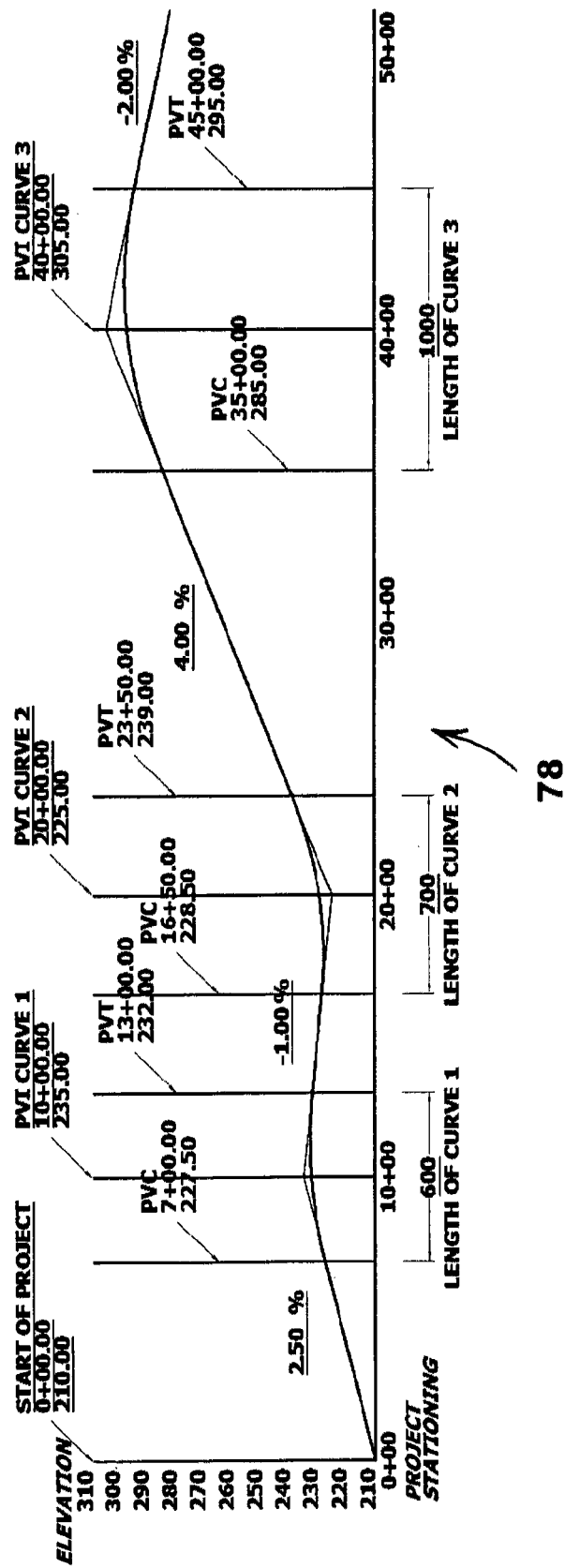
FIG. 16 shows a profile view estimating vertical alignment using measured profile.

FIG. 16 is a developmental vertical profile plot 78 of the control line 70. Numbers are in feet.

Figure 17:
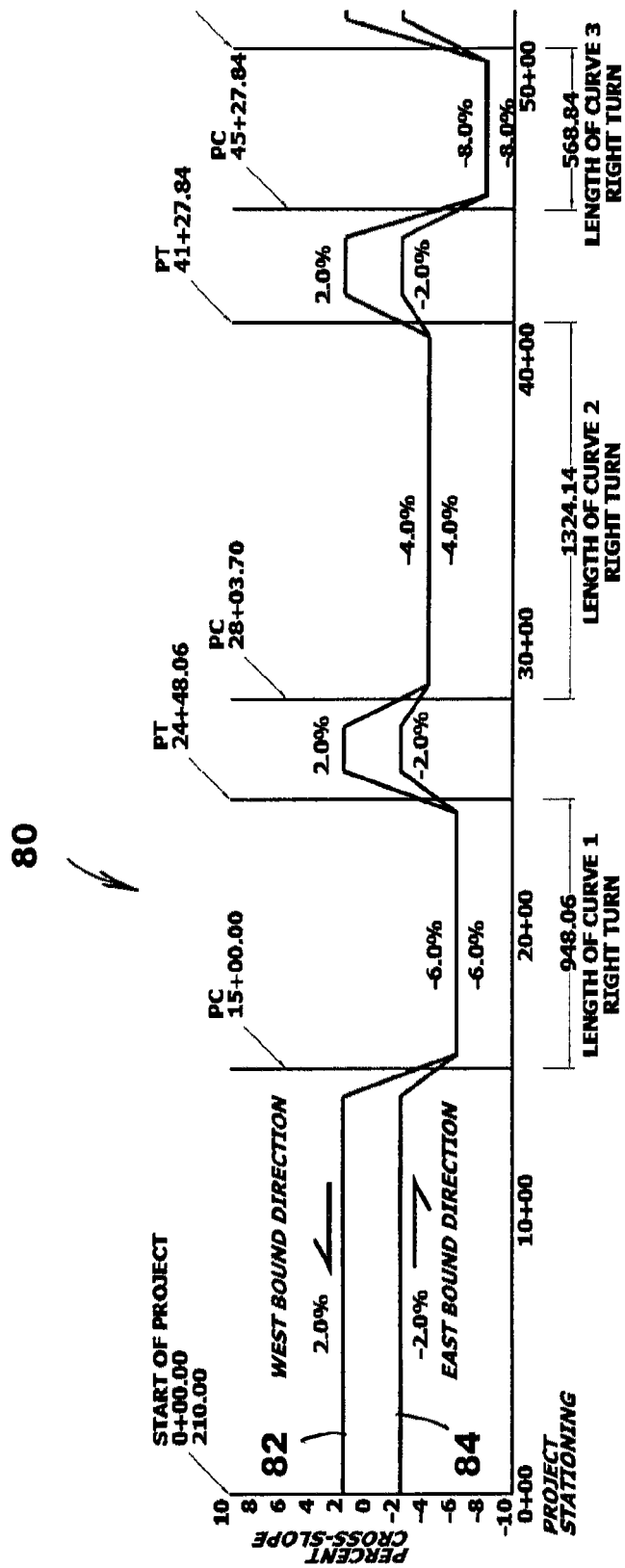
FIG. 17 shows estimating cross-slope using measurements.

FIG. 17 shows plots of cross slopes 80 and super elevation 81 for both lanes 82 and 84.

Transitions 85 are extracted from cross slope data and related to horizontal curves.

Figure 18:
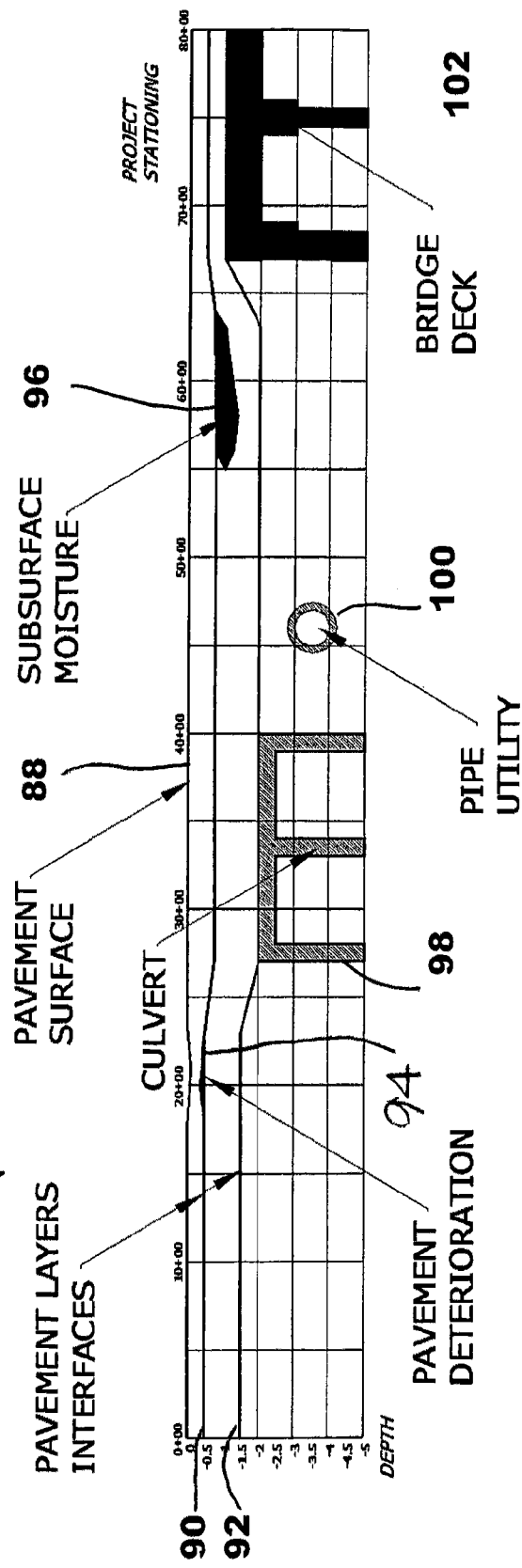
FIG. 18 shows elevation plot of recognized subsurface features GPR.

FIG. 18 shows elevation plots 86 of pavement surfaces 88, pavement layer interfaces 90, 92, showing pavement deterioration 94 subsurface moisture 96, a culvert 98, utility pipe 100 and bridge deck 102 developed from the stepped frequency GPR array.

Figure 19:
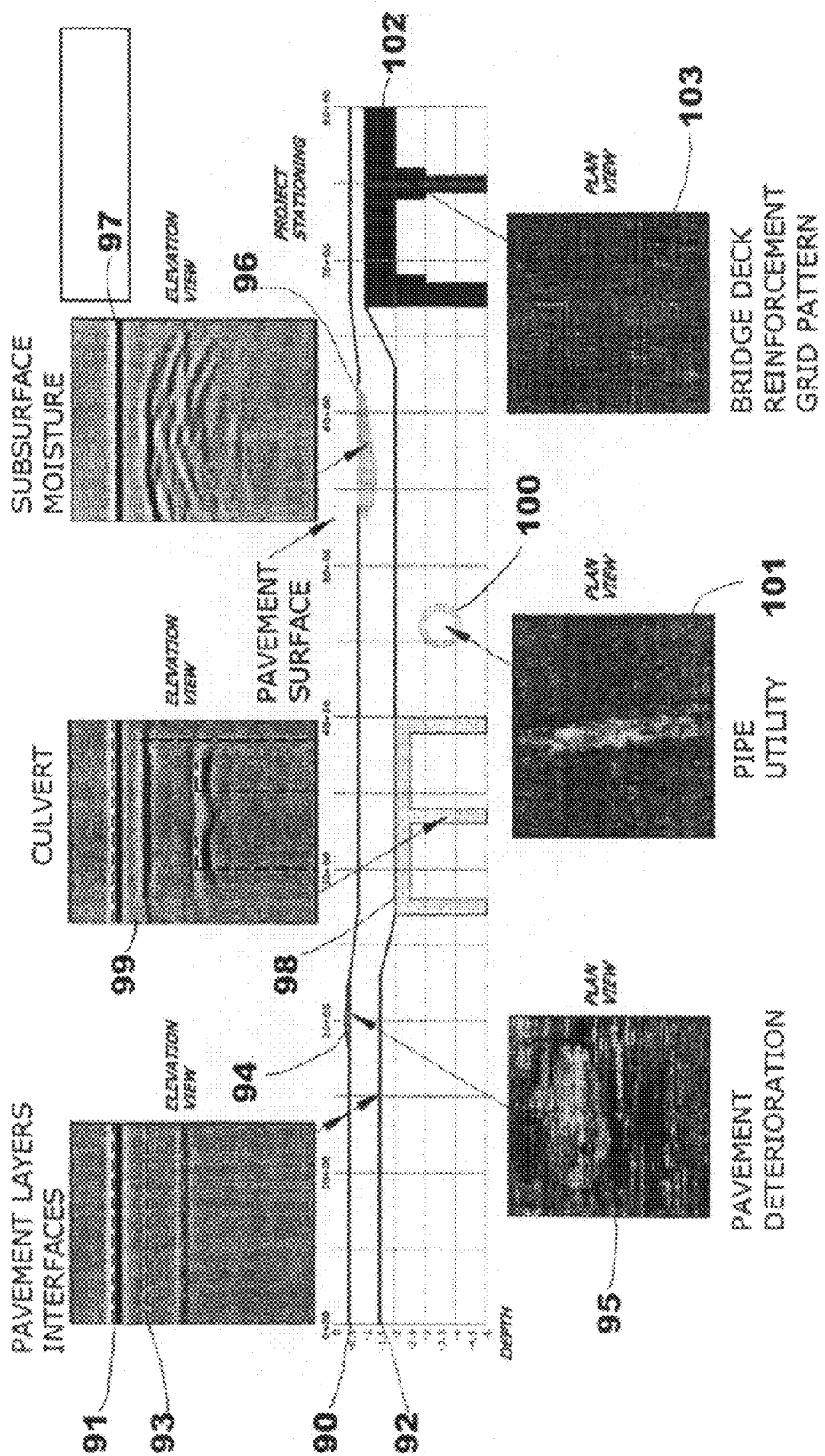
FIG. 19 shows subsurface GPR responses and resulting graphic displays.

FIG. 19 shows GPR radar reflections 91, 93 for the pavement layer interfaces 90, 92, reflections 95 and 97 for pavement deteriorations 94 and subsurface moisture 96, and reflections 99, 101 and 103 for culvert 98, utility pipe 100 and bridge deck 102, respectively.

Figure 20:
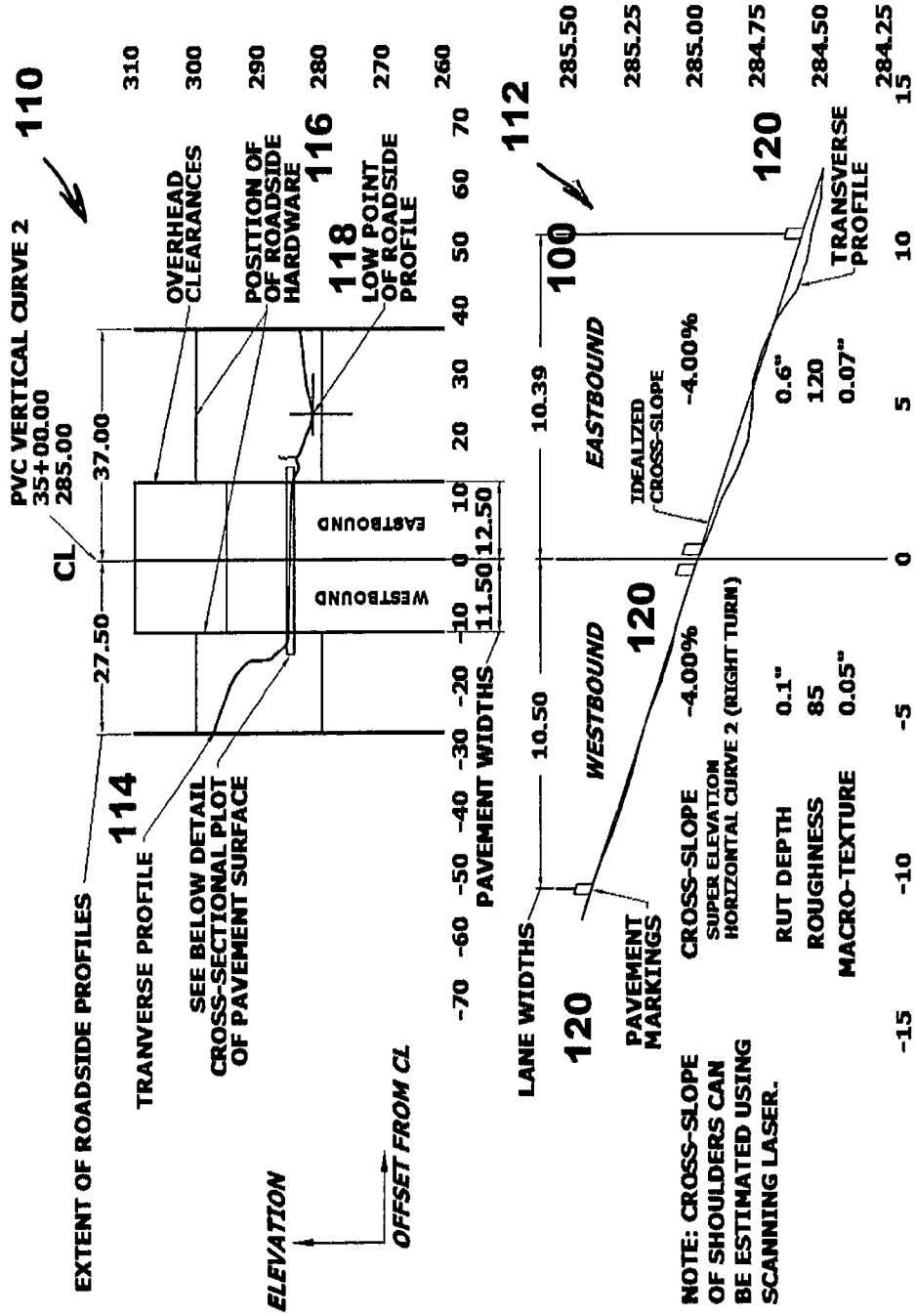
FIG. 20 shows cross-sectional of roadway profile with example plots and roadway features from the scanning.

FIG. 20 shows cross sectional plots 110, 112 of pavements in different scales developed from INU and side sensor inputs. Transverse roadside profiles 114, 116 and low point 118 as well as pavement markings 120.

Figure 21:
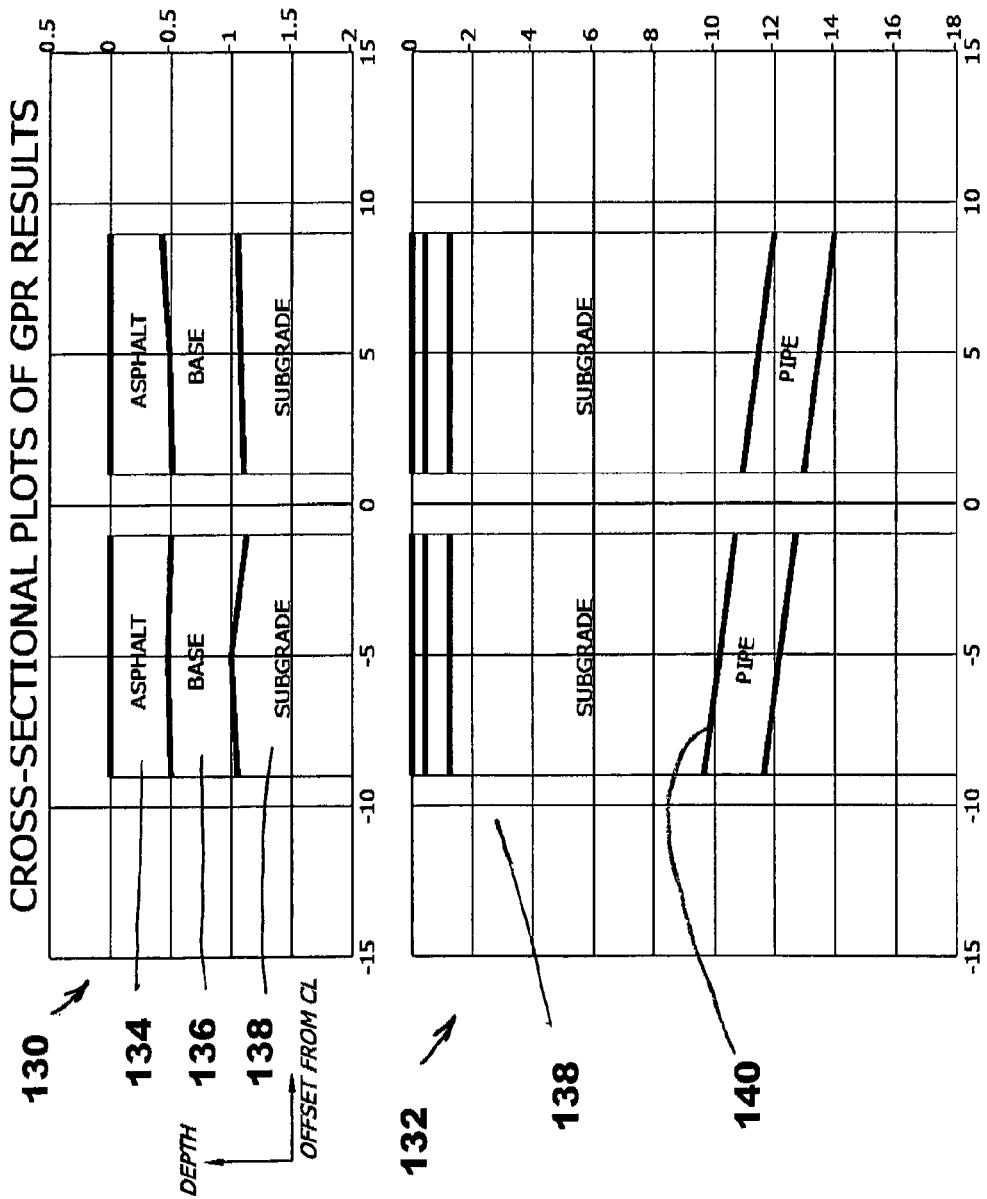
FIG. 21 shows cross-sectional plots of GPR results.

FIG. 21 has subsurface plots 130, 132 in different scales showing asphalt 134, base 136 and subgrade 138 and pipes 140 in the smaller scale plot 132.

Figure 22:
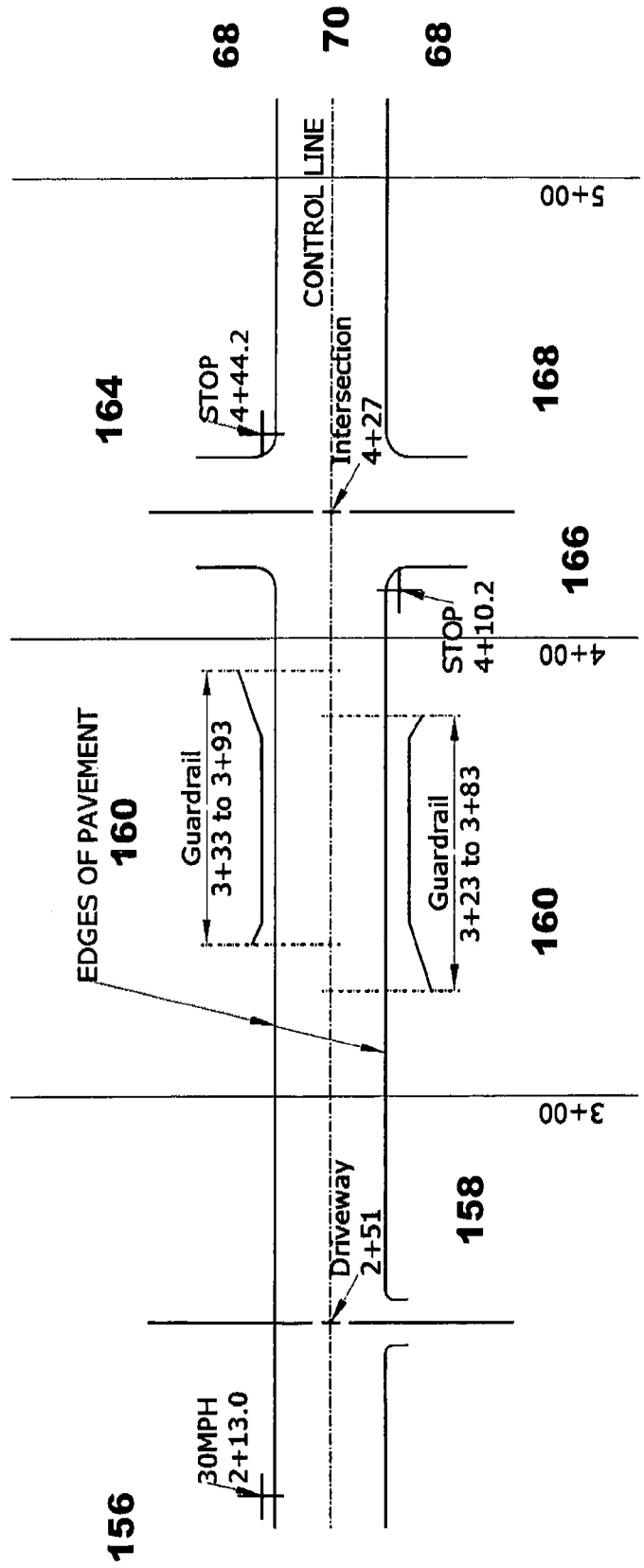
FIG. 22 shows plan view detail: roadside features, signs, guard rails, driveways and intersections.

FIG. 22 is a plan 150 showing road 152 and roadway features as examples, for example speed sign 156, driveway 158, guardrails 160, 162, stop signs 164, 166 and intersection 168 along the control line 70. Also shown are road edges 68.

Figure 23:
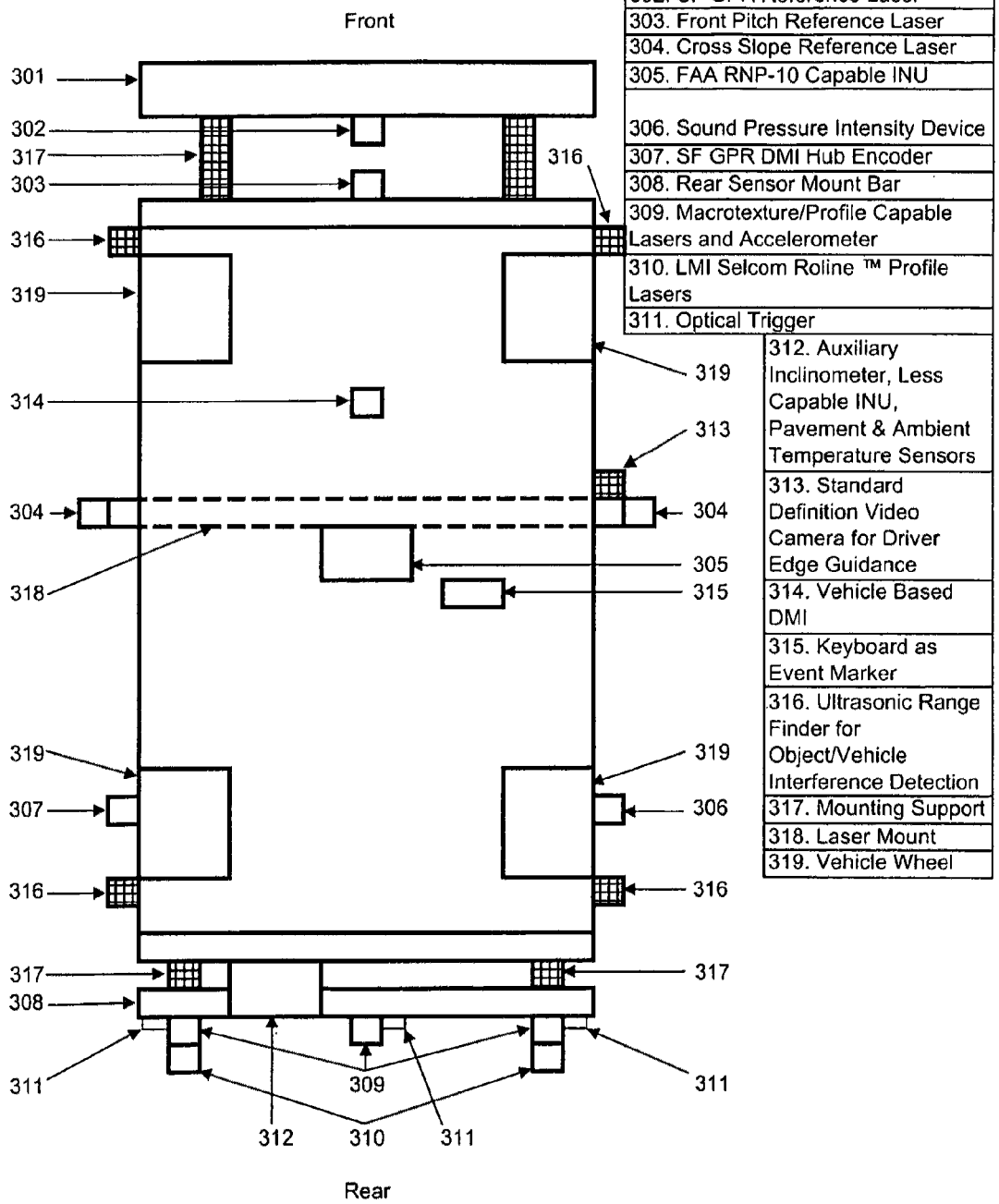
FIG. 23 shows top view, mobile platform/vehicle floor/frame height typical sensor location.

FIG. 23 is a top view diagram showing the typical sensor placement for the mobile platform/vehicle floor/frame. The LMI Selcom Roline or similar profile lasers 310 and Macrotexture/Profile Capable Lasers and accelerometer 309 are placed on either side and centrally at the rear of the platform and optical triggers 311. Auxiliary inclinometers less capable INU, and pavement and ambient temperature sensors 312 are also located at the rear of the platform, off center. All these sensors are mounted on the rear sensor mount bar 308.

Mounting supports 317 extend from the rear sensor mount bar 308 all the way along the length of the platform to the step frequency ground penetrating order (SF GPR) antenna array that extends along the width of the front edge of the platform. Ultrasonic range finders for object/vehicle interference detection 316 extend the width of the platform toward the front and rear. Four vehicle wheels 319 are located inside the boundary f the platform just centrally of the ultrasonic range finders 316 on either side of the platform.

Sound pressure intensity device 306 and SF GPR DMR Hub encoder 307 are placed on either side of the platform where the rear wheels are located. Laser mount 318 is placed just front of the center of the platform and extends the width of the platform. Cross slope reference lasers 304 are mounted on either side of the laser mount 118. FAA RNP-W capable INU 305 is placed centrally just rear of laser mount 118. Keyboard as event member 315 is placed just to the rear and side of INU 305.

Standard definition video camera for drive edge guidance 313 is placed off the laser mount 118 just front and to the side of one of the cross-slope reference lasers 304. Vehicle based DMI 314 is placed centrally in front of the laser mount 318.

Front pitch reference laser 303 is placed centrally towards the front of the platform, but in rear of antenna array 301. SFGPR reference laser 302 is located centrally just in front of reference laser 303.

Figure 24:
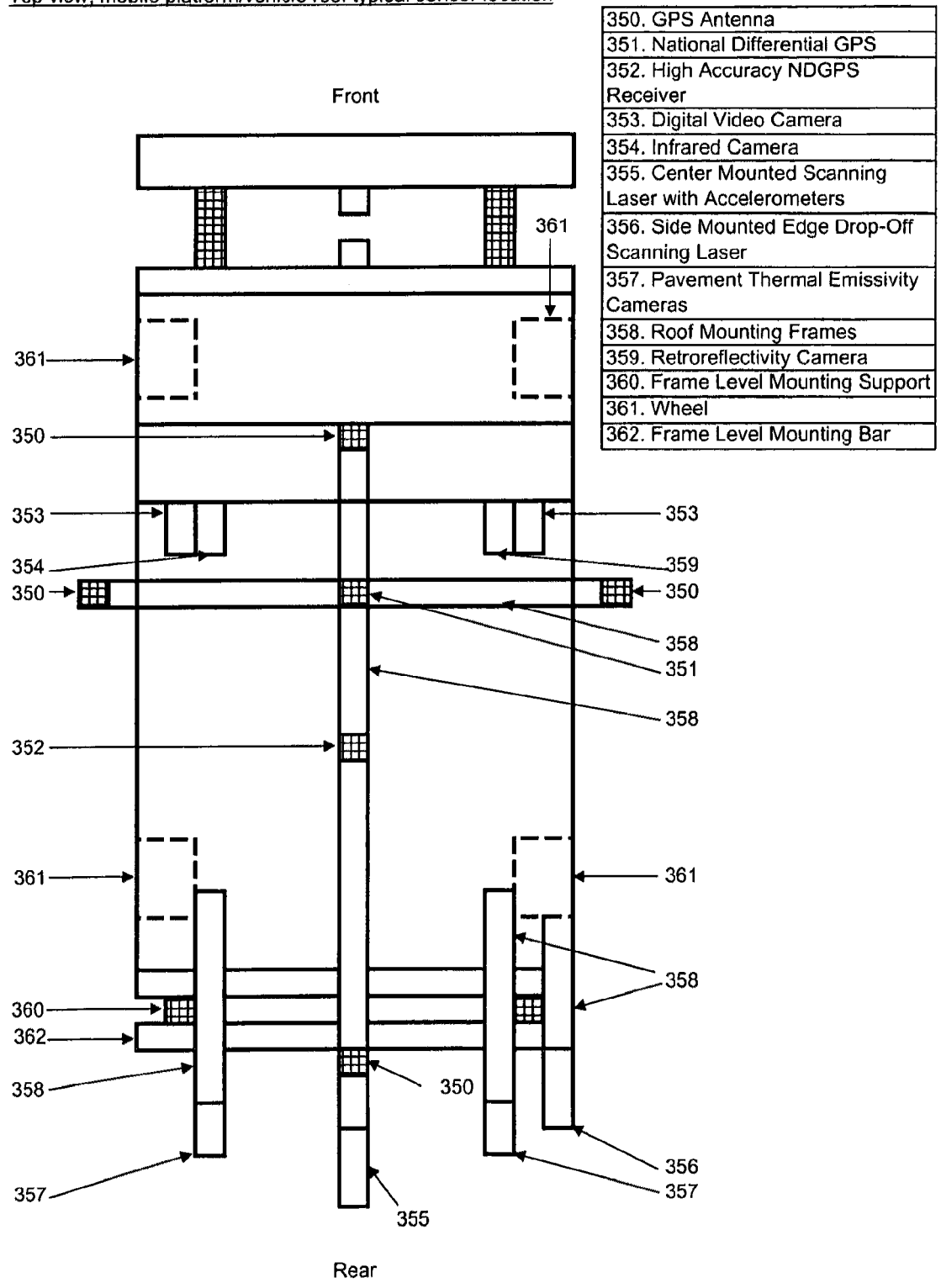
FIG. 24 shows top view, mobile platform/vehicle roof typical sensor location.

FIG. 24 is a diagram showing a top view of the typical sensor placement for the mobile platform/vehicle roof Frame level mounting bar 362 extends across the width of the platform towards the rear. Center mounted scanning laser with accelerometers 355 is mounted centrally at the rear of the platform just in rear or GPS antenna 350. Pavement thermal emissivity cameras 357 are located inside the width of the platform on either side of roof mounting frames 358. Side mounted edge drop-of scanning laser 356 is placed on one side of the platform towards the rear on roof mounting frames 358. Frame level mounting support 360 is on either side of the platform just inside the boundary of the platform.

Wheels 361 are located on either side and at the front and rear of the platform inside the platform's boundaries. One of the roof mounting frames 358 runs along the length of the center of the platform and high accuracy NDGPS receiver 352 is located on it just to the front of where the rear wheels are placed. Front GPS antenna is also on the roof mounting frames just rear of the front wheels. Another roof mounting frame 358 runs cross-wise the width of the platform at its center and two high accuracy NDGPS receivers 352 are located on either side of it. Digital video camera 353, infrared earner 354, and retroreflectivity camera 369 are within the boundaries of the platform on either side in front of cross-roof mounting frames.

Figure 25:
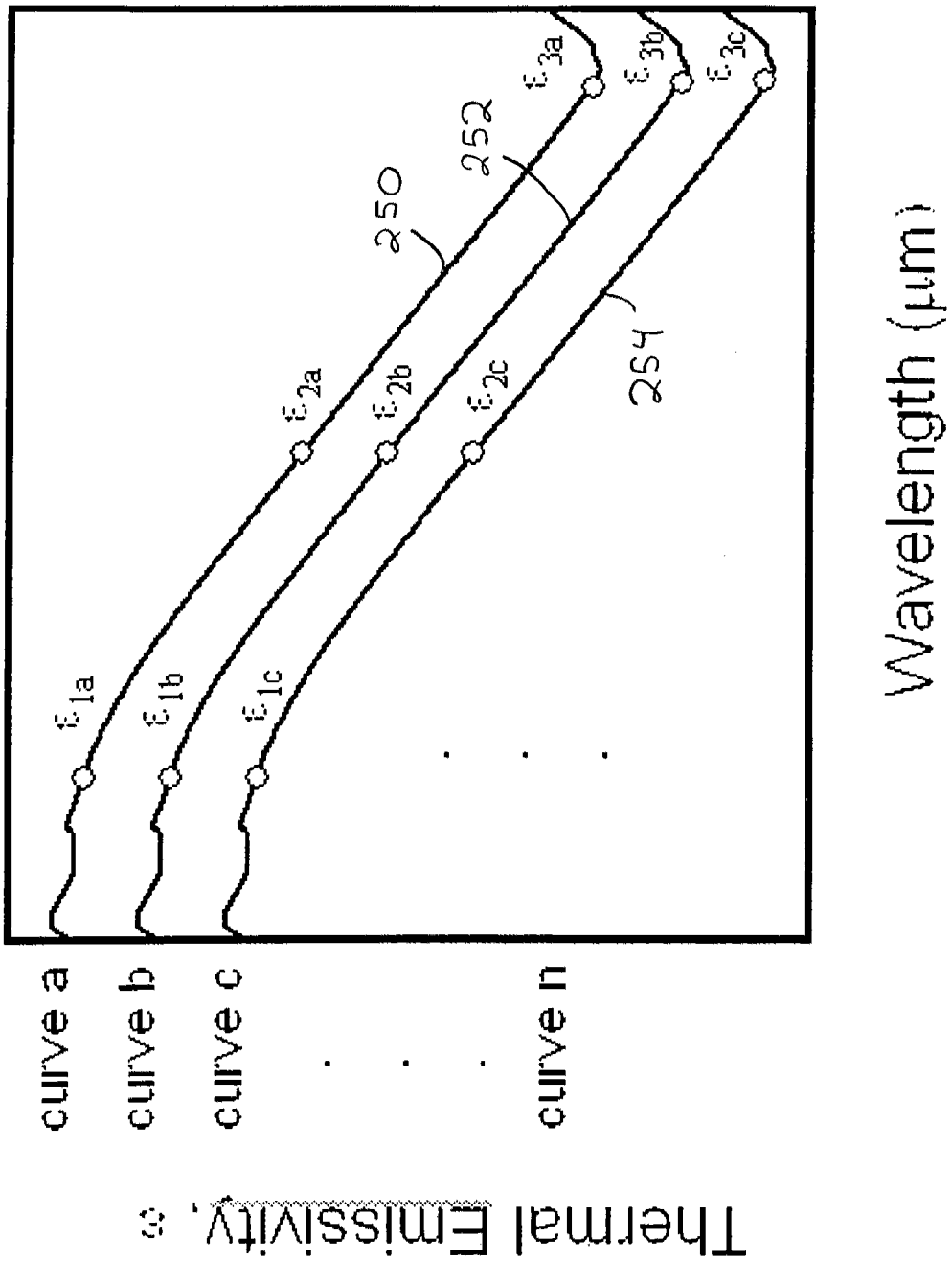
FIG. 25 is a graphic representation of thermal emissivity measurement.

FIG. 25 shows three curves 250, 252, 254 of Thermal Emissivity vs. wavelength. Each curve represents a potential set of emissivity values that correspond to the measured material properties of a given material.

Stereoscope or multiple camera image range finding is performed by developing a disparity map of corresponding points in images that are collected from different points of view. In FIG. 26, the three points labeled 200, 201 and 202 correspond to identical feature points captured in three points of view (each point of view is represented as a boxed area). The disparity map is used to compute the range to various features in the images including feature points 200, 201 and 202.

Figure 27:
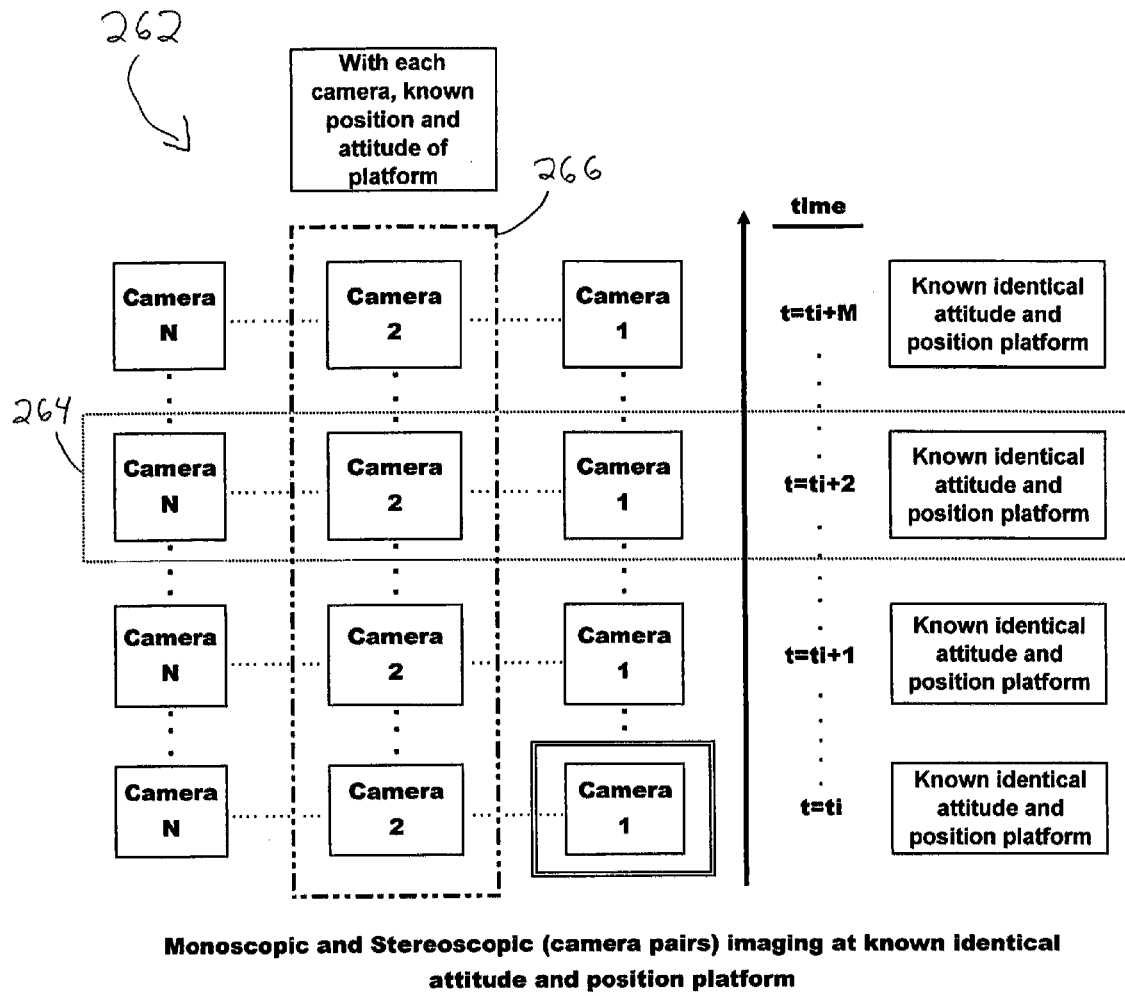
FIG. 27 shows a schematic of a database of images and the selection of sets of images for stereoscope imaging for monoscopic and combined positioning for each camera.

FIG. 27 shows a schematic of a database of images 262 and the selection of sets of images for stereoscope imaging 264 for monoscopic and combined positioning 256 for each camera.

Apparatus

Sensors on mobile platform provide location referencing of the mobile platform, location referencing of travel way features on, along side, above and below travel surface, and recognition and measurement of the travel way features themselves for the purpose of asset management, asset evaluation, and engineering measurements. Data is used for three dimensional reconstruction of the travel way on, above, and below the surface.

This system provides new, improved and previously unattained accuracies for location referencing and positioning for determining geometry of the travel way at highway speeds and the measurement and location of features on, along, above, and below the roadway by the fusion of data from many sensors.

The sensors mounted on the mobile platform shown in FIGS. 23 and 24 provide:

1) Mobile platform location referencing; using
   a. Six-degrees of freedom Ring Laser Gyroscope (RLG) 305, FIG. 23, based Inertial Navigation Unit (INU) meeting Federal Aviation Administration (FAA) Required Navigation Performance (RNP) RNP-10 unaided for 12.5 hours suitable for transoceanic flights.
   b. Distance Measurement Instrument (DMI) 307 314, FIG. 23, for measuring travel distance along the path of the mobile platform across the travel surface. The DMI is based on electrical output from the vehicle or an electromechanical device such as a wheel hub encoder, transmission odometer cable encoder, a magnetic impulse based encoder, optical encoder, or other DMI device.
   c. Scanning laser 355, FIG. 24, scanning transverse to travel way for determining transverse location of mobile platform within the travel way.
   d. Reference height displacement lasers 304, FIG. 23, along left and right side of the mobile platform for relating roll attitude of the vehicle relative to the travel surface.
   e. Rear mounted and a front mounted height displacement lasers 309 303, FIG. 23, for relating mobile platform pitch attitude relative to travel way grade.
   f. Two or more digital video cameras 353, FIG. 24, for position within travel way using travel way longitudinal features such as longitudinal joints, curbs, surface types, and surface edges pattern recognition.
   g. National Differential Global Positioning System (NDGPS) 351, FIG. 24, statically determined reference point(s).
   h. High-Accuracy National Differential Global Positioning System (HA-NDGPS) Receiver 352, FIG. 24. (Note: Government prototype hardware.)
   i. Array of four GPS receivers 350, FIG. 24, in a horizontal diamond pattern on top of vehicle for determining location and attitude of mobile platform.
   j. Mobile platform lateral position monitoring camera 313, FIG. 23, for driver guidance.
   k. Optical trigger sensors 311, FIG. 23, for location referencing of known points on travel way using traffic cone with reflective tape or a stationary travel way feature with reflective tape at a known location.
   l. Keyboard 315, FIG. 23, or similar device for event based user input.
   m. Range finding sensors 316, FIG. 23, for nearby interference, traffic, or object detection.

2) Travel surface sensors:
   a. Reference height displacement lasers 304, FIG. 23, along left and right side of the mobile platform for relating roll attitude of the vehicle relative to the travel surface.
   b. Rear mounted and a front mounted height displacement lasers 309 303, FIG. 23, for relating mobile platform pitch attitude relative to travel way grade (vertical profile).
   c. Scanning laser 355, FIG. 24, scanning transverse to travel way for locating and measuring travel way features on the travel way.
   d. Dedicated scanning laser 356, FIG. 24, (scanning transverse to travel way) for locating and measuring edge drop-off.
   e. Accelerometers mounted with the scanning laser 355, FIG. 24.
   f. Texture/inertial profile lasers 309, FIG. 13, for measuring travel way surface (requires sampling at 1 mm or less) for surface texture, inertial profile, and other surface features. Three lasers for minimum rut bar measurement.
   g. LMI Selcom Roline™ surface profile scanning lasers 310, FIG. 23.

h. Accelerometers combined with above texture/inertial profile lasers 309, FIG. 23, for measuring inertial profile and other surface features.

i. Infrared temperature sensor 312, FIG. 23, for measuring travel surface temperature.

j. Ambient air temperature sensor 312, FIG. 23.

k. Sound Pressure Intensity Device (SPID) noise sensor 306, FIG. 23, for pavement/tire noise.

l. Digital video cameras 353, FIG. 24, for stereoscopic imaging of travel way surface.

m. General purpose forward viewing broadband infrared cameras 354, FIG. 24.

n. Special purpose multi-spectral thermal emissivity camera(s) 357, FIG. 24.

3) Along side and overhead sensors:

a. Scanning laser 355, FIG. 24, scanning transverse to travel way, for locating and measuring travel way features along side and above the travel surface.

b. Forward viewing digital video cameras 353, FIG. 24, for stereoscopic imaging of along side and above travel way surface.

c. General purpose forward viewing broadband infrared cameras 354, FIG. 24.

d. Side mounted standard definition camera 313, FIG. 23, for driver edge of road guidance.

e. Range-finding ultrasonic sensors 316, FIG. 23 (data quality assurance).

f. Retro-reflectivity camera 359, FIG. 24, for traffic sign reflectivity measurements.

4) Below and near surface sensors:

a. Step-Frequency Ground Penetration Radar (SF-GPR) and SF-GPR radar antenna array 301 with attached laser 302, FIG. 23, for dynamic height measurement calibration.

b. Selective multi-spectral infrared cameras 357, FIG. 24, for measuring pavement thermal emissivity.

5) Other sensors added to the system provide additional measurements and applications.

Computer system for data acquisition on the mobile platform controls and records time and distance synchronization of sensors. A primary computer controls the data acquisition and stores the majority of sensor data and interacts with secondary special purpose computer control specialized sensor systems. Touch screen display may be used to control the system. Real-time display of selected sensor raw data is available, depending upon computer processor power.

Internal and external hard disk data storage is used to store the data acquired by the data acquisition systems connected to the various sensors.

Data acquisition hardware other than the computers, includes
1) two general purpose multifunction analog/digital boards,
2) two image acquisition boards as required by type of cameras used,
3) digital communication/interface board for RLG-INU,
4) communication/interface board for scanning laser,
5) serial ports board for HANDGPS, DGPS and GPS,
6) network port for LMI Selcom Roline™ profile lasers,
7) keyboard or other user event time record,
8) and sensor mounting hardware.

One of the general purpose multifunction analog/digital boards is used as the master control for time tagging and/or synchronization of all sensor data acquisition hardware. FIG. 2 shows the basic functional layout of the data acquisition system.

Power is provided by mobile platform when collecting data at speed. Auxiliary power from a generator and batteries is used for data collection at slower speeds.

The apparatus provides
1) multiple, redundant sensors for accurate location and position referencing,
2) synchronization of acquisition hardware using a minimum of computers (to permit direct synchronization of sensors and control power requirements),
3) first level of data fusion at hardware level with time and distance synchronization or synchronization in another domain resulting from numerical transformation of sensor outputs, and
4) location and position accuracy sufficient for project level engineering analysis and design. FIGS. 23 and 24 show a layout of sensors on the DHMS vehicle. FIG. 23 shows the sensors that are mounted at the vehicle frame/floor level. FIG. 24 shows the sensors that are mounted on the vehicle roof.

Method

The method combines outputs of various elements, including calibration, data collection, data reduction, data integration, visualization/simulation, plan/engineering drawings, and data elements.

Methods described in this document together with the previously described apparatus as mounted on a van is called the Digital Highway Measurement System (DHMS) and is directly applicable to other travel ways including but not limited to railways, runways, or any other travel surface in addition to highways and may be referred to as the Travel Way Measurement System (TWMS). Collectively, the new system apparatus and methods can be referred to as DHMS, irrespective of the travel ways which are being measure, plotted and presented.

1. Calibration

In addition to the calibration of the sensors, the position of each sensor relative to each other and the mobile platform is carefully measured.

All sensors are factory calibrated. Calibration is checked or performed on each sensor. Sensors are statically calibrated in a controlled environment to eliminate/minimize external inputs. Manufacturers procedures or internally developed procedures for checking or calibrating the sensors are performed. Positions of the sensors relative to each other is fixed by the hard point mountings. Proper orientation of the sensors at the hard point mounts are checked and adjusted.

Static calibration is also performed for a group of sensors used in a specific engineering measurement. The RLG-INU and cross slope reference height lasers are interconnected via a framing system and are calibrated for travel way cross slope measurement using a water level or similar system. The RLG-INU and grade reference height lasers are mechanically interconnected via the mobile platform frame and are calibrated for travel way grade using a water level or similar system.

Calibration measurements for ground penetrating radar are needed to determine dielectric material properties to provide an appropriate radar wave velocity corresponding to the specific pavement material being measured. Calibrations are typically conducted for each homogeneous pavement section. Two standard methods are used for most pavement thickness measurement calibrations and a new implementation of an existing method is used by the TWMS/DHMS. The first standard method uses a pavement core as a calibration reference at a known data collection location and computes the dielectric property of each pavement layer. The second standard method uses ratios of amplitudes from layer interfaces to determine dielectric properties. The second method is based on the relative amplitude of GPR reflections from successive layer interfaces. The third method is based on the Common Midpoint (CMP) method. This third method uses the SF GPR antenna array to provide an accurate, robust field calibration and can be performed from a moving vehicle. Successive pairs of antennas within the array with increasing spacing increments are rapidly interrogated to measure the dielectric material properties of materials within milliseconds. The method can be used in a stationary location or while the vehicle is in motion. A new preprocessing method is performed on the collected data from the SF GPR antenna array in preparation to processing using standard methods.

2. Data Collection

Data collection includes of a number of steps, events, and processes.
  a) Specifying case name used for file naming.
  b) Selection of sensors.
  c) Setting control parameters for sampling rates.
  d) Selecting sensors group for real-time display.
  e) Sensor initialization.
  f) Start data acquisition with synchronization controlled and monitored by data acquisition software. Synchronization is performed in both the time and distance domain or synchronization in another domain resulting from numerical transformation of sensor outputs.
  g) Event input by user action.
  h) Near real-time display of selected data sources.
  i) Ending data collection.
  j) End of collection verification and preliminary data validation.

3. Data Pre-Processing as a Part of Data Reduction

Data pre-processing includes converting the raw data into engineering units and generating basic data information used throughout the data reduction and integration effort.
  a) Scaling analog sensor data for every temporal record
  b) Extracting data from formatted/compressed data records
  c) Generating a distance for every temporal point
  d) Generating a speed for every temporal point
  e) Determining time and distance travelled for every optical trigger event
  f) Determining time and distance travelled for every user event
  g) Generating spatial based sensor data at intervals specific to analysis measurement
  h) Generating spatial based speed data at intervals specific to inertial profiles
  i) Extracting data in preparation for geometry construction
  j) Generating a scan specific index for the scanning laser
  k) Generating a travel distance for each scan of the scanning laser
  l) Converting the GPS data into State Plane Coordinates
  m) Extracting image frames from raw data and compressing the files if required by type of camera and data acquisition system used.

4. Data Reduction

Data reduction includes working with the preprocessed data to generate various engineering measurements. Processing steps are established within a set of functions.

Vehicle Trajectory Function: Vehicle trajectory is a series of x, y and z points in a relative coordinate system derived primarily from Inertial Navigation Unit (INU) and Distance Measurement Instrument (DMI) data. Inputs are Optical trigger sensors, Gyroscope, DMI data, and reference points. Method is based on numerical recurrence in three dimensions. Output is X, Y, Z coordinates of vehicle at Center of Gravity (CG) on INU. With the heading, pitch, and roll angles, and having an estimate of the length traveled by the vehicle, the numerical integration of the INU and DMI data is then reduced to a recurrence equation for position update:

$$x_{i+1} = x_i + L_i \cos(\alpha_i)\cos(\beta_i)$$

$$y_{i+1} = y_i + L_i \cos(\alpha_i)\sin(\beta_i)$$

$$z_{i+1} = z_i + L_i \sin(\alpha_i)$$

where
  $L_i$=incremental distance traveled between samples i and i+1
  $\alpha_i$=pitch angle at sample i
  $\beta_i$=heading angle at sample i
and x, y, and z are the Easting, Northing, and elevation coordinates in the state plane system. The track defined by the combination of DMI data and INU data is related to a global coordinate system using reference points of known coordinates. These reference points can be established using multiple methods: static DGPS, surveying method, or relative coordinates. The reference points are located in the dynamic DHMS data using markers and optical trigger sensors as well as other recognizable control points within the sensor data. The optical triggers are short-range laser sensors that output an "on" signal when "markers" are found in the sensor line of sight.

All outputs are referenced with respect to CG of INU. The Nationwide Differential Global Positioning System (NDGPS) data is used to check the relative consistency of the vehicle trajectory computed independently. No integration of the two measurements is performed to prevent corruption by NDGPS data, as observed in other third party GPS systems.

Measurement of Pavement Markings Function: The measurement of Pavement Markings (primarily centerlines and lane lines) relative to the centerline of the vehicle and the vehicle trajectory is used in determining vehicle wander and lane horizontal position. Vehicle wander is the side-to-side movement of a vehicle as it travels along the lane travel path. The side-to-side movement is the result of driver steering inputs and vehicle responses to the road surface. The method uses pattern recognition of scanning laser transverse scans and reflective signal strengths and/or image processing of digital images using line detection algorithms. Output is for each transverse scan and/or for each image frame and the position of pavement marking with respect to vehicle centerline. A pattern recognition algorithm of the reflective signal strength with transverse coordinates is used to identify the pavement markings. When pavement markings are not present, longitudinal lane joints for concrete pavements may be recognized via digital image pattern recognition.

The scanning laser returns the distance range from the laser and the encoder angle. An X distance (transverse to the line of travel) and a Y distance (height) relative to the scanning laser position are computed for each data point sampled by the sensor.

$$X = \cos(\text{encoder angle}) \times \text{Range}$$

$$Y = \sin(\text{encoder angle}) \times \text{Range}$$

In addition to the range and encoder angle data, the strength of the returned signal is also contained in the data stream. Signal strength ranges from 0 to 255. Signal strength is higher then the surrounding pavement when the laser scans a pavement marking. FIG. 3 shows the signal strength peaks for a double yellow centerline (on left) and a lane edge line (on right).

Prior to pattern recognition, a filter may be applied to the signal to better highlight peaks and minimize higher signal return strengths due to vegetation along the side of the road.

Pattern recognition of these pavement markings is performed by first identifying those points above and below a signal strength threshold value that are potentially due to a pavement marking and within a specified offset range from the centerline of the vehicle. Points above the threshold are assigned a value of one, and those below the threshold a value of 0. Given a standard pavement marking layout and line width, scanning laser sampling rate, and scanning laser rotation rate, a matching pattern array of 0's and 1's is established for comparison. For example, the following pattern array could be used to represent a double yellow centerline:

00000111000111100000 where, the 1's denote a high signal reflective strength for the pavement marking and the 0's represent the surrounding roadway surface. The pattern array and the array based on threshold values are then compared, with the pattern array being shifted from side-to-side until the best match is found. The center location of the double yellow centerline relative to the vehicle centerline can then be established from the X and Y position data for these same sampled data points. A similar procedure is used for single lane lines. The pattern array for matching would be of the following general form:

00000000000011100000 where, the 1's denote a high signal strength for the single lane line pavement marking and the 0's represent the surrounding pavement surface.

Thus the transverse position of the pavement markings relative to the vehicle centerline can be established. The time synchronized gyroscope information and DMI data are used to assign temporal and spatial based position information for these scanning laser identified lane line markings.

As identification of a lane line marking can be a false positive, a series of these one-dimensionally identified lane line pavement markings can be established in a two dimensional horizontal plane. Pattern recognition algorithms are used to further identify the pavement markings and their location by eliminating false positives from the one-dimensional recognition process, and by filling in missing points for lane edge positioning.

Measurement of Lane Width Function: Given the identification and positioning of the lane markings or longitudinal joints as described in the Measurement of Pavement Markings Function, the positional information on lane edges is used to compute lane width. Inputs are Pavement Markings, Gyroscope, DMI data, and positioning of sensors on DHM vehicle. Method involves fusion of pavement markings, vehicle trajectory, DMI data, and pattern recognition filter to define individual lane markings along the trajectory of vehicle. Output for each transverse scan is an estimate of lane width. As identification of a lane line marking, longitudinal joint or pavement edge can be a false positive, a series of these one-dimensionally identified features can be established in a two dimensional horizontal plane. Pattern recognition algorithms are used to further identify the features and their location by eliminating false positives from the one-dimensional recognition process, and by filling in missing points for lane edge positioning. Lane width is then computed knowing the transverse positional information for the lane edges:

$$W = |X_r - X_l|$$

where,
 W=lane width
 $X_l$=left lane edge transverse X distance
 $X_r$=right lane edge transverse X distance.

Measurement of Cross slope: The vehicle roll with respect to the pavement surface is required to relate measurements taken on board the DHMS vehicle to the pavement surface properties, specifically for this function, pavement cross-slope. Pavement cross-slope (superelevation, crossfall) is one of the parameters of horizontal alignment and roadway cross sections. Cross-slope in the traveled lane during data collection is determined primarily from the INU vehicle roll measurement and the cross-slope reference laser measurements. Inputs are gyroscope, reference lasers, DMI data, vehicle trajectory, scanning laser, and positioning of sensors on DHM vehicle. Method involves geometric equality defined as absolute cross-slope equal to vehicle roll angle+relative roll of vehicle with respect to pavement surface. Redundant measurements using scanning laser data to estimate average relative roll of vehicle with respect to pavement surface can be used to verify/supplement the measurement. Output is cross-slope estimates for traveled lane. For pavement cross-slope, vehicle roll relative to the pavement surface must be accounted for in the extraction of alignment and the fusing of data for building roadway cross sections. The roll angle of the vehicle relative to the pavement surface is computed as:

$$R_{veh|p} = \tan^{-1}[(L_L - L_R)/D_L]$$

where,
 $R_{veh|p}$=Roll angle of vehicle relative to the pavement surface
 $L_L$=Height measured with left mounted vehicle reference laser
 $L_R$=Height measured with right mounted vehicle reference laser
 $D_L$=transverse distance between left and right mounted vehicle reference lasers.

Vehicle roll angle $R_{veh}$ is the arctangent of the transverse slope component of the vehicle trajectory or is the roll angle output by the INU.

Pavement cross-slope angle is therefore computed as:

$$CS = R_{veh} + R_{veh|p}$$

where,
 CS=pavement cross-slope angle (or expressed as a slope or percentage %)
 $R_{veh}$=Vehicle roll angle
 Rveh|p=Vehicle roll angle relative to pavement surface.

Measurement of Vehicle Pitch and Pavement Vertical Grade Function: The vehicle pitch with respect to the pavement surface is required to relate measurements taken on board the vehicle to the pavement surface properties, specifically for the pavement vertical grade. Pavement vertical grade is needed for the extraction of vertical alignment. Inputs are rear laser data and center or front reference lasers, DMI data, vehicle trajectory, and positioning of sensors on vehicle. Method involves geometric equality defined as vehicle pitch relative to the pavement surface is linearly proportional to the difference in height distance measured by the lasers in the rear and the center (or front) of the vehicle divided by the distance between the two locations. The pitch angle is the arc tangent of this ratio. Geometric equality defined as absolute grade (as an angle) equal to vehicle pitch angle plus relative pitch angle of vehicle with respect to pavement surface. Output is vehicle pitch angle with respect to pavement surface and vertical grade estimates of the pavement for traveled lane. The pitch angle of the vehicle relative to the pavement surface is computed as:

$$P_{veh|p} = (H_C - H_r)/D_L$$

where,
 $P_{veh|p}$=Pitch angle of vehicle relative to the pavement surface $H_c$=Height measured with centrally located vehicle reference lasers
$H_r$=Height measured with rear mounted vehicle lasers
$D_L$=longitudinal distance between rear and centrally located vehicle lasers.

Vehicle pitch angle $P_{veh}$ is the arctangent of the vertical slope component of the vehicle trajectory or is the pitch angle output by the INU.

Pavement grade angle is therefore computed as:

$$Grade=P_{veh}+P_{veh|p}$$

where,
Grade=pavement surface angle (or expressed as a grade %)
$P_{veh}$=Vehicle pitch angle
$P_{veh|p}$=Vehicle pitch angle relative to pavement surface.

Measurement of Vehicle Wander Function: Given the identification and positioning of the lane markings or longitudinal joints relative to the vehicle centerline as described in "Pavement Marking Measurement Function", vehicle trajectory can be adjusted for vehicle wander to produce a local travel lane control line. Inputs are vehicle trajectory, cross-slope, vertical grade, lane width, pavement markings, and selected control line. Method involves numerical interpolation and geometric projection from vehicle trajectory to control line. Output is the three-dimensional definition of a control line on the pavement. FIG. 4 illustrates how vehicle wander is defined and used to establish the three dimensional definition of the lane control line and by inference, to a project control line.

In this case, the left lane edge is the control line. Vehicle trajectory coordinates Xv, Yv, and Zv are developed as described in "Vehicle Trajectory Function" section. The distance between the vehicle centerline and left lane edge is determined by the method described in "Pavement Marking Measurement Function" section. Vehicle wander is the distance between the centerline of the vehicle (also the vehicle trajectory) and the lane control line. Coordinates of the lane control line Xc, Yc and Zc (or an overall control line) are determined by adjusting the vehicle trajectory coordinates by a three dimensional projection of the vehicle wander distance D based on the cross slope of the pavement surface and heading of the vehicle.

Measurement of Edge of Pavement Function: Pattern recognition is applied to the roadway transverse profile data in the detection and measurement of edge of pavement. Pattern Recognition (PR) is the search for structure in data. Inputs are scanning laser, digital images, gyroscope, reference lasers, vehicle trajectory, DMI data, and positioning of sensors on vehicle. The method involves pattern recognition of scanning laser transverse scan and reflective signal strength and/or image processing of digital images using line detection algorithms. The output for each transverse scan is the position of the edge of pavement with respect to vehicle centerline.

In addition to the range and encoder angle data, the strength of the returned signal is also contained in the data stream. Signal strength ranges from 0 to 255. Signal strength is 0 when an object is out of range and is filtered out of the data. Signals from trees and bushes can be filtered out as the range information will fluctuate rapidly and reflective signal strength will be high (vegetation has a high reflective strength). The surface outside of the driving lane is examined using scanning laser data for surface roughness where a smooth surface would indicate a paved shoulder of a certain width and a rough surface would indicate a curb or a rough, poor or non-existent paved shoulder. Transition from the smooth lane or paved shoulder surface to a rougher surface indicates that an edge of pavement has occurred. Also, vegetation, which may exist at or near the pavement edge, has a higher reflective signal strength, again indicating a possible edge of pavement. Severely overgrown vegetation can hang-over or cover the true edge of pavement on a poorly maintained road. As identification of a feature can be a false positive, a series of these one-dimensionally identified edge features can be established in a two dimensional horizontal plane. Pattern recognition algorithms are then used to further identify these features and their location by eliminating false positives from the one-dimensional recognition process, and by filling in missing points if needed.

Edge detection algorithms are also applied to the digital images. Detected line edges in the proper orientation and general position are compared to surrounding line edges to select the most appropriate line segment.

Measurement of Edge Drop-off Function: Pattern recognition is applied to the roadway profile data in the detection and measurement of Edge Drop-Off. Inputs are edge of pavement, scanning laser, DMI data, vehicle trajectory, and positioning of sensors on DHMS vehicle. The method involves pattern recognition of scanning laser transverse scan and reflective signal strength. Output is for each transverse scan with estimate of edge drop-off with respect to vehicle centerline based on edge of pavement point and points past edge of pavement.

The surface outside of the driving lane is examined using scanning laser data for surface roughness where a smooth surface would indicate a paved shoulder of a certain width and a rough surface would indicate a curb or a rough, poor or non-existent paved shoulder. Transition from the smooth lane or paved shoulder surface to a rougher surface indicates that an edge of pavement has occurred. At the edge of pavement, where a curb does not exist, the 1 to 2 foot wide region beyond the edge of pavement can be examined for edge-drop-off. Edge drop-off occurs where: 1) right side tires have left the pavement (maybe due to narrow road, vehicle wander, poor alignments, or passing on shoulder) and has caused rutting in a soft shoulder, 2) right side tires have left the pavement and has caused rutting via displacement of loose material, 3) erosion along edge of pavement from surface drainage on a grade, 4) original road construction had no shoulder, possibly with an immediate down slope for drainage, 5) ditch immediately adjacent to pavement edge, and 6) combination of these or other factors. FIG. 5 shows four examples of edge drop off. Scale is in inches. The four graphs start at the edge of pavement.

Edge Drop-Off is measured as the difference in elevation between the edge of pavement and roadside profile elevation.

$$EDO=E_{eop}-E_p$$

where,
EDO=edge drop-off,
$E_{eop}$=elevation at edge of pavement
$E_p$=low point elevation of roadside profile within a specified distance Another dedicated scanning laser mounted closer to the edge of the vehicle or lightly beyond the edge of vehicle can improve on the accuracy of this measurement. The additional laser can more accurately measure the edge drop-off features that may be occluded from the viewpoint of the centerline mounted single scanning laser approach.

Measurement of Roadside Profile Function: Scanning laser transverse profiles are filtered to remove overhanging vegetation reflections from the roadside profile data. Roadside profile data can be used for drainage analysis, roadside safety analysis, and for roadside feature recognition and measurement. Inputs include edge of pavement, scanning laser, DMI data, control line, and positioning of sensors on DHMS vehicle. Method involves pattern recognition of scanning laser transverse scan and reflective signal strength and filtering out overhanging vegetation and raised man-made objects. Output for each transverse scan is the roadside profile with respect to vehicle centerline. As configured on a vehicle, the scanning laser returns the distance range from the laser and the encoder angle. The scanning laser continuously scans a 360 degree circle, perpendicular to the travel direction. The scanning laser therefore transversely measures distances across the road, along the roadside, and overhead. An X distance (transverse to the line of travel) and a Y distance (height) relative to the scanning laser position are computed for each data point sampled by the sensor.

$$X=\cos(\text{encoder angle}) \times \text{Range}$$

$$Y=\sin(\text{encoder angle}) \times \text{Range}$$

In addition to the range and encoder angle data, the strength of the returned signal is also contained in the data stream. Signal strength is normally higher when the laser point is on vegetation. Signal strength is 0 when an object is out of range and is filtered out of the data.

Measurement of Pavement Surface Roughness Function: Using the inertial profiles derived from the rear mounted profiling lasers and accelerometers positioned within the vehicle wheel paths, an inertial profile can be computed and subsequently processed with the International Roughness Index (IRI) ride quality algorithm. This method is limited in the measurement of long wavelengths. The highway geometry vertical profile, derived from the INU and combined with the lasers, serve as another profile source for the IRI algorithm and is not limited in the measurement of long wave lengths. Inputs are accelerometers, inertial profiling/macro-texture lasers, DMI data, control line, and positioning of sensors on vehicle, and/or the INU data. The method is based on World Bank method for measuring IRI. Outputs are inertial profile with IRI, and INU based profile with IRI. Lasers placed in the left and right wheel path are used to measure vertical vehicle motion relative to the pavement. Accelerometers, co-linear with the lasers, measure vehicle vertical motion.

Measurement of Pavement Surface Macrotexture Function: The data collected by the macro-texture lasers is used to compute Mean Profile Depth using the ASTM E1845 algorithm or the proprietary ROSAN algorithm. The texture data can be used for a number of purposes including aggregate segregation analysis and noise and friction estimates. Inputs are Inertial profiling/macro-texture lasers, DMI data, control line, and positioning of sensors on vehicle. The method is as described in ASTM E1845 standard or the proprietary ROSAN method. Output is Mean Profile Depth. Three macro-texture lasers with a 0.5 mm dot size and a 128 mm measurement range, optimally configured at a sampling rate of 32,000 samples/sec, are used for both macro-texture measurement and inertial profiling. A laser is placed in the left and right wheel path for inertial profiling, and with a third laser placed in the center of the vehicle, macro-texture data is collected with all three lasers. Using the ASTM E1845 or ROSAN method for computing Mean Profile Depth, the data can be used for friction and noise analysis, transverse and longitudinal aggregate segregation analysis, and condition assessment of applied pavement texture surfaces. The same data can be used for a number of other analysis functions. Vertical movement of the vehicle does not interfere with the macro-texture Mean Profile Depth computations or with the identification of joints (and large cracks) as the vehicle movement wavelengths are far larger than those used in the computations.

Measurement of Joints and Faulting Function: The data collected by the macro-texture lasers is used to identify and measure joints and compute faulting at the pavement joint. Vertical movement of the vehicle does not interfere with the identification of joints (and large cracks) as the vehicle movement wavelengths are far larger than those used in the joints and faulting computations. Inputs are the inertial profiling/macro-texture lasers, DMI data, control line, and positioning of sensors on vehicle. Method based on a technique developed by Starodub, Inc. named the Warp and Curl method. Outputs are Joint/transverse Crack location and Faulting. Joint width, depth, and spacing are determined from the 1 mm spaced texture data. With the joints identified, faulting can be computed. FIG. 6 shows a joint and the pavement surface before and after the joint for a distance of 0.25 meters. Regression analysis is used to fit a line representing the pavement surface before and after the joint. The difference in line height at the joint is the faulting measurement and is computed as:

$$\text{Faulting} = H_d - H_u,$$

where,
Faulting=slab height difference at joint
$H_d$=fitted line predicted height of slab immediately downstream of joint
$H_u$=fitted line predicted height of slab immediately upstream of joint.
In this example, the faulting is negative.

Faulting data can be used as one measurement within a pavement condition index.

Measurement of Pavement Warp and Curl (Rigid Pavements):

Data recorded by macrotexture measurement capable lasers within the DHMS system are used in a method to measure rigid pavement (concrete/not asphaltic pavements) to identify joints and large cracks within a travel lane. The method also includes a longitudinal matching of joints in adjacent lanes. With the concrete slaps identified, the shape of the slab is determined by extracting the slab profile from the inertial profile or the INU/laser based profile. This method permits the building of a data base for subsequent pavement performance analysis with the accurate road geometry/location information. Pavement temperature data is used in the analysis of pavement slap warp and curl.

Measurement of Tire-Pavement Interaction Noise Function:

A Sound Pressure Intensity Device (SPID is used to record tire-pavement interaction noise according to standard procedures. The data is used in combination with the recorded surface data and outputs from the "Pavement Surface Roughness Function", "Pavement Surface Macrotexture Function", "Pavement Warp & Curl Fucntion", and the "Joints and Faulting Function" to analyze interrelationships. The DHMS location referencing methods permits the synchronization of the above data elements and analysis results mapped the precise road geometry/location information.

Measurement of Vertical Clearances: Scanning laser data may be used to survey the roof of tunnels, the underside of overpasses, and the underside of overhead sign structures. The scanning laser data is reviewed to determine vertical clearances for each traveled lane. A series of these low clearance points can be established in a two dimensional horizontal plane and the global low clearance points within each lane identified for a specific overhead structure.

Measurement of Roadside Features: The data collected by the DHMS vehicle is used in the measurement of roadside features. Input includes digital images, DMI, vehicle trajectory, and position of sensors on the DHMS vehicle. The method involves image processing of monoscopic and stereoscopic digital images for road side features with distinctive edge features. Output is the identification of roadside features and positioning with respect to vehicle trajectory.

A multitude of roadside features can be identified, located, and measured utilizing the scanning laser and digital imaging system. Features which may be identified by the scanning laser include guardrails of a large variety of types, attenuators, retaining walls, bridge walls, buildings, ditches, lowpoints, cross roads, driveways, etc. Many of these same features may be identified with image processing plus other features such as signs, signals, and other features of interest.

For features where scanning laser data is complemented by stereo image data or stereo image data is used exclusively, stereoscopic properties of the three dimensional (3D) world are computed using pairs of digital images to estimate range to features. This process requires four basic steps, which include: 1) feature detection, 2) feature extraction/feature matching, 3) determining the underlying geometry calibration, and 4 using disparity to establish a disparity map that can be converted to a 3D map. By definition, feature detection extracts a target automatically out of an image, feature matching finds points in one image that can be associated with correlated points in another image, calibration calculates the geometry of the stereo system and disparity establishes the disparity map that can be converted to a 3D map of the present scene. In addition to determining stereoscopic imaging parameters, roadside features in the scene may be specifically identified and analyzed. These roadside features are identified and interpreted using pattern recognition algorithms and optical character recognition algorithms for signs.

Measurements made by the DHMS scanning laser are described in detail in the "Measurement of Pavement Markings." These measurements include the location of pavement markings, among many other features. These scanning laser measurements are used to directly compute the range to features. When scanning laser data does not capture a feature, or in cases where stereoscopic image data complements scanning laser data, stereoscopic imaging is used either directly or together with scanning laser data, as appropriate. In each case complementary methods are used to compute the 3D range to features using scanning laser data and/or stereoscopic imaging data to optimize the result. Several methods are expected to be used to preprocess images by optimizing them for accurate feature identification and analysis. These methods include super-resolution image processing, dynamic thresholding, edge detection, and (as part of stereoscopic imaging) corners detection.

Measurement of Driveways: Most driveways are recognized from the roadside profiles defined by the scanning laser data. However, digital images can provide additional verification and validation of the pattern recognition on roadside profiles, especially for those driveways with odd geometry. Input includes digital images, DMI, vehicle trajectory, and positioning of sensors on DHMS vehicle. The method involves image processing of monoscopic and stereoscopic images for driveways based on edge detection, texture segmentation, and roadside profiles. Output is the identification of roadside driveway features and positioning with respect to vehicle trajectory.

Driveways vary greatly in their design with respect to materials (paved, gravel, soil), geometry (width, slope), design (curbed, no curb), vertical transition to the road (smooth, gutter present, abrupt), and horizontal transition (turn radius). Identification and positioning of driveway information is useful for safety and operations analysis.

Elements of roadside feature identification and location are described in detail in "Measurement of Roadside Features". The same type of methodology is applied to driveway features.

Measurement of Overhead Features: Most overhead features are found using the scanning laser. The primary focus of this function is overhead signs that cannot be found reliably using the scanning laser. Input includes digital images, DMI, vehicle trajectory, and positioning of sensors on DHMS vehicle. The method involves image processing of monoscopic and stereoscopic digital images for overhead traffic control devices. Output is the identification of overhead features and positioning with respect to vehicle trajectory.

Scanning laser data may be used to survey the roof of tunnels, the underside of overpasses, and the underside of overhead sign structures. The data is reviewed to find the low points for each traveled lane. Critical points can then be identified. Overhead traffic control devices are best identified and located with digital image processing.

Elements of roadside feature identification and location are described in detail in "Measurement of Roadside Features". The same type of methodology is applied to overhead features.

Measurement of Cable Guardrail and Other Types: The guardrail recognition algorithm is based on pattern recognition in scanning laser data. Guardrails are also detectable in digital images. For certain type of guardrail cable, digital images will be the primary source of information to detect them. Input includes digital images, DMI, vehicle trajectory, and positioning of sensors on DHMS vehicle. The method involves image processing of monoscopic and stereoscopic digital images for guardrails. Output is the identification of guardrails and positioning with respect to vehicle trajectory. Image processing consisting of edge detection may easily identify cable guardrails and other longitudinal, angled, or transverse oriented guardrail placements of timber, flat faced, W beam, or other type construction.

Drainage facilities (ditches etc.) Function: Scanning laser roadside profile offset and height data is used to locate drainage low points along side road.

Measurement of Traffic Signals Function: Traffic signals are identified in an image using pattern recognition of traffic signal lenses shape, traffic signal head configurations and color matching of traffic signal lenses that are lit. Traffic signal recognition using successive images further identify, locate, and confirm their presence in the longitudinal and transverse dimensions. Signals recognized and measured via image processing are located in three dimensions relative to the vehicle using stereoscopic techniques and are then located relative to the roadway given the precise location and attitude of the vehicle relative to the road geometry as established in the Apparatus and Geometry. Traffic signal poles and mast arms are identified in an image using pattern and edge detection recognition given the presence of traffic signals.

Highway Traffic Sign Inventory Function: Signs and sign posts are initially identified in an image using a standard edge detection method and then further identified by their shape (rectangular, diamond, octagon, triangular, etc) and size. Traffic signs are further identified via optical character recognition after the images have been deblurred, contrast adjusted, and rotated to remove character elongation. Sign recognition using successive images further identify, locate, and confirm their presence in the longitudinal and transverse dimensions. Signs recognized and measured via image processing are located in three dimensions relative to the vehicle using stereoscopic techniques and are then located relative to the roadway given the precise location and attitude of the vehicle relative to the road geometry as established in the Apparatus and Geometry Claims.

Measurement of Pavement Thickness Function: The data collected by the SF-GPR array on the DHMS vehicle is used in the measurement of pavement thickness. Input includes frequency domain Step Frequency Ground Penetrating Radar (SF-GPR) measurements, calibration data (from new CMP method adaptation to an antenna array, reference core, or construction data). The new CMP method involves a common midpoint (CMP) test to estimate material properties in each homogeneous pavement section, which will provide required calibration reference data. The new CMP method is described in "Applications of Step Frequency Ground Penetrating Radar." Material interface reflections are subsequently located in the time domain of the SF-GPR data. Pavement thickness is calculated by calibrating depth values corresponding to time of flight data. Output is thickness of asphalt overlay, base, sub-base and depth of sub-base/sub-grade interface. The thickness of pavement layers can be measured using SF-GPR, provided that adequate dielectric contrast exists between the material layers, adequate penetration below the surface is achieved and adequate data sampling is used.

SF-GPR hardware takes advantage of an antenna array to collect data along parallel paths while mounted on a data collection vehicle (such as the DHMS) traveling down a highway. This array configuration allows hardware to be configured to collect data using fewer antennas for, high speed pavement profiling applications or a large number of antennas to image detailed variations of pavement thickness in selected areas at slower speeds. High speed pavement thickness profiling measurements are typically made using three active antenna pairs in the SF GPR array, while slower speed pavement thickness measurements use all antenna pairs in the SF GPR antenna array, as shown in FIG. 7. High speed testing allows pavement profiling to be carried out along three distinct profiling paths, while slower speed testing allows collected data to be used for subsurface tomographic imaging of pavement layers.

Adjustments can be made to the SF-GPR configuration for each data collection survey in order to optimize performance. Options that can be configured for each survey including the number of antenna pairs used, the distance traveled between each data collection location, the dwell time spent at each discrete frequency, and the bandwidth of frequencies used for each scan, (FIG. 7). Longer dwell times typically improve the signal to noise ratio of the GPR response, but are limited by the amount of time available while the vehicle travels along the data collection path. A maximum data collection speed is therefore determined by the dwell time in combination with other available configuration options. The capability to adjust the bandwidth of the GPR is unique to Step Frequency GPR. Adjusting bandwidth allows the user to transmit low frequencies to detect deep features, high frequencies to detect shallow features with high resolution or a combination of both.

Pavement layer thicknesses are typically computed at each sampled location using one of two methods. In one method, after pavement layers have been identified in the data, each waveform is analyzed individually. In this method, calibration reference data is used to convert individual time domain GPR waveforms directly into thickness values using dielectric material property information derived from the calibration. This calculation requires additional terms for multiple layers, but the basic relationship is defined in equation for a single pavement layer:

$$d_1 = \frac{ct_1}{2\sqrt{\varepsilon_{r,1}}}$$

where:
$d_1$=Thickness of $1^{st}$ layer
$t_1$=Electromagnetic two way travel time
c=Speed of light in free space
$\varepsilon_{r,1}$=Dielectric constant of $1^{st}$ layer The second method that is often used to evaluate pavement thickness requires data to be converted from the time domain into the reconstructed spatial domain by performing migration or wavefield backpropagation calculations. These calculations are computationally intensive and are currently only be used for project level data evaluations due to the time required to process the data. The results from these spatial domain reconstructions can be particularly useful for locating subsurface objects and defect and deterioration features, but for pavement layer thickness calculations they are usually not necessary.

Measurement of Pavement Thickness Function (complements FWD or RWD modulus testing): The data collected by the SF-GPR on the DHMS vehicle is used in the measurement of pavement thickness complementing Falling Weight Deflectometer (FWD) or Rolling Weight Deflectometer (RWD) modulus testing. Input is as described in "Measurement of Pavement Thickness" plus FWD or RWD data. The method involves calculating modulus of a pavement using AASHTO standard methods. Output is the modulus of elasticity of pavement material layers (with improved accuracy due to known pavement layer thickness values). Reliable, continuous measurements of pavement thickness data will have a variety of uses, including input to Falling Weight Deflectometer (FWD) or Rolling Wheel Deflectometer (RWD) pavement modulus calculations that improve their accuracy.

Measurement of Culvert Size, Orientation and Depth Function: The data collected by the SF-GPR on the DHMS vehicle is used in the measurement of culvert size, orientation and depth. Input is time domain SF-GPR data, calibration data from the Common Mid-Point method (as described in "Applications of Step Frequency Ground Penetrating Radar (SF GPR)", reference core, or construction data, and DMI/position data. The method is invoked after culverts have been detected in local SF-GPR data. The location of each culvert is reconstructed using tomographic imaging methods that convert data from the time domain into the spatial domain and material property calibration data derived from the common midpoint method (CMP). The size, orientation and depth of the culvert below the surface will be determined based on measurements of features in resulting spatial domain images. The method reconstructs local data using a migration algorithm or wavefield backpropagation algorithm. The method uses a pattern recognition algorithm to identify features and determine dimensions. Output includes width, length, depth and orientation of the culvert.

Measurement of Pipe Size, Orientation and Depth Function: The data collected by the SF-GPR on the DHMS vehicle is used in the measurement of pipe size, orientation and depth. Input is time domain SF-GPR data, calibration data from the Common Mid-Point method (as described in "Applications of Step Frequency Ground Penetrating Radar (SF GPR)", reference core, or construction data, pavement thickness data, and DMI/position data. The method involves parabola fitting method to derive the diameter of the pipe. Use pavement thickness data from the Measurement at Pavement Thickness Function to determine depth. Use DMI/position data together with time of flight SF-GPR data to determine orientation based on detected feature location relative to highway location. Output is diameter, depth and orientation of pipe Detection of Subsurface Deterioration or Defects in Pavements, Culverts and Pipes: Detection of subsurface deterioration or defects in pavement, culverts and pipes (metal pipes and other subsurface metals cannot be penetrated) method locates irregularities in subsurface data corresponding to deterioration or defects in subsurface features using pattern recognition techniques. Method involves correlating subsurface characteristics with anticipated corresponding irregularities in surface data. If correlation is low, reject deterioration/defect categorization or categorize as subsurface phenomena only. Input to the method is the output from "Measurement of Pavement Thickness Function", "Culvert Size, Orientation and Depth Function", "Pipe Size, Orientation and Depth Function", inertial profiling pavement data, and scanning laser data. Output is the location, estimated size and category of deterioration/damage feature.

Pattern recognition of features in data is thoroughly described in the "Measurement of Culvert Size, Orientation and Depth" section. Please refer to that section for detailed information on this topic. In addition to the basic pattern recognition approach described in the referenced section, deterioration and defects are detected using modified pattern recognition algorithms. For example, SF-GPR responses to pavement, pipe and culvert defect and distress features will vary substantially in comparison to SF-GPR responses to pavement, pipe and culvert features themselves. Therefore it will be important to identify defect and distress features based on the changes that defects and distress introduce in the responses to engineered subsurface objects.

Measurement of Concrete Bridge Deck Cover Depth and Asphalt Overlay Thickness Function: The data collected by the SF-GPR on the DHMS vehicle is used in detecting of concrete bridge deck cover depth and asphalt overlay thickness. Input is time domain SF-GPR data and the Common Mid-Point data (as described in "Applications of Step Frequency Ground Penetrating Radar (SF GPR). The method involves reconstructing data using a migration algorithm or wavefield backpropagation algorithm. A pattern recognition algorithm identifies features and determines the relative position of the surface, bridge deck overlay interface and reinforcing steel. Output is the depth from the surface to the top mat of reinforcing steel (cover depth) and overlay thickness.

Detection of Subsurface Deterioration or Defects in Bridge Decks Function: The data collected by the SF-GPR on the DHMS vehicle is used in detecting subsurface deterioration or defects in bridge decks. Input is time domain SF-GPR data and the Common Mid-Point data (as described in "Applications of Step Frequency Ground Penetrating Radar (SF GPR). The method involves locating irregularities in subsurface data corresponding to deterioration or defects in bridge deck using pattern recognition techniques. The method also includes correlating subsurface characteristics with anticipated corresponding irregularities in surface data. If correlation is high then classify the deterioration or defect. If the correlation is low, then reject deterioration/defect categorization or categorize as subsurface phenomena only. Output is the location, estimated size and category of deterioration/damage feature.

Detection of High Concentrations of Subsurface Moisture Function: The data collected by the SF-GPR on the DHMS vehicle is used in detecting the presence of subsurface moisture. Input is the time domain SF-GPR data and the Common Mid-Point data (as described in "Applications of Step Frequency Ground Penetrating Radar (SF GPR". Method locates unusually high magnitude SF-GPR responses corresponding to reflections from areas where the high dielectric constant of water contrasts with substantially lower values for highway materials. If a large phase change accompanies the reflection but it is not approaching 180 degrees as closely as water, the material is categorized as water. The Method identifies areas where significant amounts of salt water are present using a pattern recognition algorithm. Output includes location and extent of local water concentrations.

Detection of High Chloride Concentrations in the Presence of Subsurface Moisture Function: The data collected by the SF-GPR on the DHMS vehicle is used in detecting the presence of high chloride concentrations in the presence of subsurface moisture. Input is the Time domain SF-GPR data and the Common Mid-Point data (as described in "Applications of Step Frequency Ground Penetrating Radar (SF GPR). The method locates unusually high magnitude SF-GPR responses (corresponding to reflections from areas where the high dielectric constant of water contrasts with substantially lower values for highway materials). If a large phase change accompanies the reflection and approaches 180 degrees, the material is categorized as salt water. The method identifies areas where significant amounts of salt water are present using a pattern recognition algorithm. Output is the location and extent of local salt water concentrations.

Measurement of Presence, Location and Condition of Buried Utilities Function: The data collected by the SF-GPR on the DHMS vehicle is used in the measurement of utility location, size, orientation and depth. Input is time domain SF-GPR data, calibration data from the Common Mid-Point method (as described in "Applications of Step Frequency Ground Penetrating Radar (SF GPR)", reference core, or construction data, pavement thickness data, and DMI/position data. Method involves a parabola fitting method to derive the diameter of the utility. Dielectric property are used to classify material as concrete, plastic, fiberglass, metal, etc. Use DMI/position data together with time of flight SF-GPR data to determine orientation based on detection feature location relative to highway location. Output is location, size, depth, material, and orientation of underground utility.

Multi-Spectral Thermal Emissivity Measurement Function: A method is proposed to measure thermal emissivity using measurements in 2, 3 or more spectral ranges. The measurements are currently proposed for applications to asphalt pavements, but they can be tailored to meet concrete pavement evaluation needs as well. The method fits the behavior to the appropriate curve, (among a family of thermal emissivity curves), in the process of making each thermal emissivity measurement. The best representative curve is determined and therefore the thermal emissivity measurement at the selected spectral position is refined based on trends in the data.

The simplest implementation of this method, (used here in an example derivation of thermal emissivity at a single wavelength), uses a linear fit to a multi-spectral thermal emissivity curve that maintains consistent behavior, (true for pavement roughness as a pavement wears out as shown in FIG. 25.

The method determines the best estimate of the thermal emissivity, $\in_1$, by making measurements at two, three or multiple points along the multi-spectral curve and back calculating $\in_1$ values for each measurement using the characteristic slope of the curve. The final $\in_1$ value is determined by calculating the mean of the set of $\in_1$ values derived from the measurements along the curve.

This method is based on an expansion of Planck's law, which allows an estimate of the thermal emissivity to be determined at long wavelengths (7 to 14 μm) as [2], [3]:

$$\varepsilon_\lambda = c\left(\frac{I}{I_{Ave}}\right)^2 + (cal_{ice_\lambda} - ref_\lambda)$$

where:

I=Intensity of long wavelength measurement at a given measurement location $I_{Ave}$=Intensity of average long wavelength response c=Calibration constant determined from a "black body" reference measurement $cal_{ice_\lambda}$=Calibration measurement for ice at wavelength λ

$ref_\lambda$=Reference value for $Cal_{ice_\lambda}$ [4]

$cal_{ice}$ can also be determined for ranges of wavelengths using the following expressions:

$$cal_{ice} = \left(\frac{\varepsilon_{ice_n} - \varepsilon_{ice_S}}{\lambda_n - \lambda_S}\right)$$

$$c\left(\frac{\left(\left(\frac{I}{I_{Ave}}\right)_{Ice_n}\right)^2 - \left(\left(\frac{I}{I_{Ave}}\right)_{Ice_S}\right)^2}{\lambda_n - \lambda_S}\right) \approx 0.005 \text{ for ice where:}$$

$n = 9 \text{ μm} \rightarrow \varepsilon = 0.985$ $S = 8 \text{ μm} \rightarrow \varepsilon = 0.980$ The multi-spectral emissivity measurement has a linear slope for asphalt between 8 μm and 9 μm and can be computed using reference data from a NASA study [4]. For example, a measured slope for asphalt between 8 μm and 9 μm is:

$$\frac{0.966 - .0978}{1} = -0.012$$

Therefore, between 8 μm and 9 μm, the following expressions can be used to determine an accurate value for $\varepsilon_s$ of an asphalt material:

$$\varepsilon_i = (\lambda_i - \lambda_S)(0.012 - 0.05 + cal_{ice}) + c\left(\frac{I_i}{I_{Ave}}\right)^2$$

$$\varepsilon_i = (\lambda_i - \lambda_S)(0.007 + cal_{ice}) + c\left(\frac{I_i}{I_{Ave}}\right)^2$$

$$\varepsilon_{s,\lambda} = \frac{\sum_{i=1}^{n} \varepsilon_i}{n}$$

$\varepsilon_s$ can be computed for broader ranges of multi-spectral thermal emissivity measurements using additional piecewise equation definitions that are valid in each range.

The thermal emissivity at a specific $\varepsilon_\lambda$ is computed with improved accuracy based on measurements made at multiple points on the infrared spectrum. The multi-spectral measurements are used to determine which emissivity curve matches best based on reference measurement behavior provided in [4].

REFERENCES

[1] Ibos, L., Marchetti, M., Boudenne, A., Datcu, S., Candau, Y., Livet, J., "Infrared Emissivity Measurement Device Principle and Applications," Measurement Science and Technology, Vol. 17, 2006, pp. 2950-2956.

[2] LeSchack, L., Del Grande, N. K., "A Dual-Wavelength Thermal Infrared Scanner as a Potential Airborne Geophysical Exploration Tool," Geophysics, Vol. 41, No. 6, December 1976, pp. 1318-1336.

[3] Del Grande, N. K., Durbin, P. F., "Dual-Band Infrared Imaging to Detect Corrosion Damage Within Airframes and Concrete Structures," Proceedings of SPIE Thermosense XVI, Orlando, Fla., Apr. 4-8, 1994.

Applications of Step Frequency Ground Penetrating Radar (SF GPR):

A novel Common Midpoint (CMP) material characterization method has been developed for implementation using an SF GPR antenna array as depicted in FIGS. 8 and 9.

a) Successive pairs of antennas with increasing spacing increments are rapidly interrogated to accurately measure the dielectric material properties of pavement materials while in motion (new CMP implementation feature).

b) The measurement process can be completed within milliseconds c) The technique can be used in a stationary location or while the DHMS vehicle is in motion.

Selective SF GPR antenna array element utilization based on speed, resolution and signal processing requirements (including MUSIC/vector imaging)

a) Use SF GPR antenna array to collect data with selected pairs of array elements b) Use all combinations of transmitter and receiver pairs to collect data for MUSIC signal processing implementation or other vector based array processing techniques (ESPRIT, Capon, etc.)

c) Use fewer elements and sparser sampling for high speed data collection d) Use additional antenna array elements for higher resolution if low speed and refined sampling are needed.

5. Data Integration

Data integration involves processing the data in a sequence of functions. The DHMS functional flow chart is presented in FIGS. 1A and 1B. In data reduction, a number of functions were described. The data elements output by these data reduction functions are integrated to produce lane and road control lines, deriving the horizontal and vertical alignment, computing cross slope data, identifying and locating sub-surface features relative to the three dimensional alignment, generating cross section data, and locating roadside features.

FIGS. 10 through 22 depict the integration process for a two-lane road. The process is similar for multi-lane roads and divided highways. The steps within each integration process are described here.

A control line is established for each lane. Once each lanes control line is established, an overall roadway or direction specific control line is defined. The vehicle trajectory and pavement marking recognition results for lane wander and lane width are fused to define a control line 101.

FIG. 10 shows the vehicle path for the eastbound direction, segments 62 of transverse laser scans 64 used in pavement marking recognition, and, if appropriate for the given road, the edges 68 of pavement 66 is also determined. For a two-lane road the control line 70 for the lane is often defined as the center lane marking. The same steps are performed for the opposing direction FIG. 11 for this two-lane road. A local distance stationing 73 of the control line 70 is performed and is shown in FIG. 13. Stationing can be converted to a project level coordinate reference to match existing survey information.

With the control line established, horizontal alignment can be extracted from the control line 70. FIGS. 13 and 14 present typical plan views showing horizontal alignment. The process of determining the alignment parameters is described here. Constant heading defines tangent sections. A constant heading change indicates a circular curve. Heading changes varying from zero degrees to a then fixed constant heading change indicates a spiral transition curve. With the beginning and ending points of the horizontal curve established and the change in heading and length of the horizontal curve now known, all the common horizontal curve parameters can be determined.

With the control line 70 established, vertical alignment 77 can also be extracted from the control line. FIGS. 15 and 16 present typical elevation views of the vertical alignment. Constant grade defines the tangent sections of the vertical profile. Segments with varying grade denote vertical curve location and their length. The vertical points of curvature, intersection, and tangency can be established as well as the length of the vertical curve. The vertical curves are tested to determine if they are of the standard parabola shape.

The DHMS accurately measures cross slope and its location. Travel lanes have a cross slope to assist in draining the pavement surface of any water. Horizontal curves may be superelevated to assist in cornering. Superelevation is an important roadway element for safe conveyance of a vehicle. FIG. 17 depicts the cross slope and superelevation for a two-lane road. Transitions 85 from normal cross slope to superelevation can be extracted from the cross slope data and related to the horizontal curves. Length of transition and transition location can be determined.

Using the identified subsurface features and their location, and the previously established roadway alignment information, plan, elevation, and cross section drawings showing these subsurface features can be produced. FIGS. 18 and 19 show example subsurface features drawings.

Cross section plots 110,112 can be produced given the alignment data and road side profiles as shown in FIG. 20. In addition, the cross sections can be enhanced by the by displaying any number of roadside, overhead, and subsurface features as all locations and measurements are known as shown in FIG. 21.

Because the DHMS system also identifies roadside features using the scanning laser and/or stereoscopic digital imaging, plan drawings can prepared showing the location of the road and roadside features such as intersections, driveways, traffic sign, guardrail, or any other identified feature of interest as shown in FIG. 22.

DHMS position referencing technology is synchronized with SF GPR data collection to provide unprecedented data collection and data reconstruction accuracy. Synchronization is achieved via time domain registration of SF GPR spatial triggers with complementary DHMS position measurements. Registration may also be achieved via registration in the spatial domain or in mathematically transformed domains. Position information is used to locate SF GPR data relative to site coordinates and is particularly useful in reconstructing three-dimensional SF GPR data collected along curved geometries. Position information is used to accurately determine the relative position of individual data collection runs. This process allows subsurface data to subsequently be registered together in two and three-dimensional images.

Metal tape markings (placed in specified site locations of interest) are integrated into processed, reconstructed SF GPR data to create reference marks and written messages/codes in SF GPR data output. The process uses a SF GPR antenna array to collect data over areas that have been intentionally covered with metal tape. The metal tape typically has an aluminum alloy on one side and an adhesive backing on the other. The metal tape is arranged in geometric patterns that represent letters, markers or codes on pavement or concrete surfaces. After data has been collected over marked locations together with adjacent locations of interest, data is post processed involving techniques that reveal the geometry of the markings as they were originally placed on the pavement, (including GPR data migration and/or reconstruction techniques).

6. Visulization/Simulation

Programs visualize raw and processed data. These programs verify sensor operation, help locate data of interest, help in the development of new algorithms, and display intermediate and final results. The Analog_Viewer program can display any of the raw analog sensor data scaled by parameters contained within the sensor calibration file. The Scanning_Viewer program displays the scanning laser range and angle data in converted (X,Y) coordinates and also the raw data for many of the relevant fields within each scan. The SYNC_Viewer program displays much of the pre-processed and some of the processed data in a temporal time frame. Left and right camera images are displayed with a plot showing either the NDGPS and INU processed (X,Y) coordinates or the scanning laser transverse roadway scans. The user has the option of displaying either vehicle based data or road based data in four graphs. The vehicle-based data includes heading, pitch, and roll in degrees and height in inches. Road based data includes elevation, cross slope, filtered inertial profile, and IRI. The X-axis is time in seconds. For each of the four graphs, and the INU/NDGPS graph, cursors indicate corresponding values as the digital images are displayed. The SYNC_Viewer program permits the user to relate roadway or roadside features with the raw sensor and video data. The ANIMATION_MAKER program combines the processed roadway geometry and roadside profiles collected from the two directions of travel, along with the video images into an ".avi" file in which a plan view, elevation view, cross section view, video image, and an edge detection processed image is played as the vehicle is driven down the road. The Plan view encompasses a 4000 ft by 4000 ft viewing area, the elevation view is for 4000 ft and the cross section view is 100 feet wide.

7. Plan/Engineering Drawings

The SCRIPT_MAKER program takes the centerline geometry trajectory file along with the geometry cross section file and generates a draft script file that in turn is processed by the translator macro for final clean-up prior to processing by AUTOCAD. A 3-D drawing of the road and roadside is generated by AUTOCAD. Centerline, lane markings, edge of pavement, vehicle trajectory, and other features can be included in the drawing. Depending on the amount of detail desired the user could specify the number of roadside points to be used in the final drawing.

Typical Plan and Elevation drawings along with cross section drawings are produced by the DHMS software. Output suitable for other third party CAD and GIS software may also be generated.

Accuracy

The unique combination of hardware and software algorithms provides measurement accuracy that has not been achieved previously from a mobile platform for several measurement applications (described in detail in the specification).

Digital Highway Measurement System Accuracies

| Inertial Navigation Unit Drift Rate < 0.008 Degrees/Hr | |
|---|---|
| Highway Alignment Key Points | |
| Horizontal | <2 feet |
| Vertical Grade: | <0.01% |
| Cross Scope: | ±0.01% |
| Pavement Marking Position: | <1 inch |
| Vehicle Wander Removal: | <1 inch |
| Edge of Pavement: | <6 inches |
| Roadside Profile: | 0.25 inches at 50 feet |
| Vertical Clearance: | <1 inch |
| Step-Frequency GPR | |
| Asphalt Layer Thickness: | ±0.1 inch for 2-8" pavement |
| Concrete Layer Thickness: | ±0.2 inch or 6-14 inch pavement |
| Penetration Depth: | 10 feet, 20-30 feet under excellent conditions |
| Subsurface Facilities Depth: | ±6 inches, subgrade material ≦ 10 feet (accuracy at greater depths to be determined) |
| Subsurface Facilities Size: | ±1 foot, subgrade material ≦ 10 feet (accuracy at greater depths to be determined) |
| Macrotexture: | Within Standard Specifications |
| Roughness: | Within Standard Specifications |

Roadside Hardware (Under Development)
Target of 95% recognition success rate.

While the invention has been described with reference to specific embodiments, modification and variations of the invention may be constructed without departing from the scope of the invention, which is defined in the following claims.

We claim:

1. Travel way measurement system, comprising a platform with a position determining unit (PDU) mounted on a vehicle for indicating heading, pitch and roll of the vehicle, a computer mounted in the platform for recording heading, pitch and roll information from the PDU, distance measuring instruments (DMI) connected to the vehicle and to the computer for providing travel distance information to the computer, sensors mounted on the platform and connected to the computer for providing information of distances of the sensors above the surface of the travel way, a scanner mounted on the platform adapted for scanning around the vehicle transverse to a longitudinal axis of the vehicle on, over and adjacent to the surface of the travel way and connected to the computer for providing to the computer position range, angular position, and reflective signal strength information relative to the scanner and to the vehicle of objects along, over and away and adjacent to the travel way, whereby the computer determines and records precise locations of the platform along the travel way, precise positions of the platform in the travel way, and precise slopes and surface conditions of the travel way, and adapted for detecting edge of pavement, roadside profile, edge drop-off, shoulder, curbs, sidewalk, guardrails, roadside features, driveways, drainage facilities, pavement distress, vertical clearance, overhead features, surface roughness, and adapted for providing location referenced outputs of cross sections, visualizations, simulations, plan and elevation drawings, data for software, and 2D and 3D rendering.

2. The system of claim 1, wherein the computer determines objects and measurements of the objects along, over, on, adjacent to and away from the travel way using information from the scanner.

3. The system of claim 1, wherein the platform is the vehicle, the scanner is a scanning laser and the PDU is an inertial navigation unit (INU).

4. The system of claim 3, wherein the scanning laser scans relative to the platform and wherein the sensors comprise side sensors mounted on sides of the platform, and connected to the computer for sensing and recording heights of the sides of the vehicle above the surface of the travel way, front and rear sensors mounted on the platform and connected to the computer for measuring front and rear heights of the vehicle above the surface.

5. The system of claim 1, further comprising a ground penetrating radar (GPR) array mounted to the vehicle, the dedicated distance measuring (DMI) connected to the vehicle and to the GPR array for triggering the GPR array, the dedicated DMI and the GPR array connected to a GPR computing device for providing to the GPR computing device continuous information of a position of the vehicle of depths of subsurface layer interfaces below the surface of the travel way, whereby the GPR computer analyzes the surfaces below the travel way as surfaces of a travel way bed, utilities, culverts and infrastructure under the travel way.

6. The system of claim 1, wherein the travel way is a highway and the computer takes information from the scanner to determine relative position of the vehicle with respect to the travel way.

7. The system of claim 1, further comprising selective multispectral infrared cameras mounted on the vehicle for measuring thermal emissivity of the travel way in multiple spectral ranges, wherein the multispectral infrared cameras are connected to the computer for recording pavement thermal emissivity in the multiple spectral ranges.

8. The system of claim 1, further comprising a side mounted camera connected to the vehicle and a display visually accessible for edge of travel way surface position guidance and measurement.

9. A travel way bed measurement system of claim 1, further comprising a subsurface measurement system, mounted on the a ground penetrating radar (GPR) array mounted to the vehicle, a distance measuring instrument (DMI) mounted on the vehicle, the DMI and the GPR array connected to a computing device for providing longitudinal travel information of the vehicle position and continuous information of positions of surfaces and subsurface layer interfaces and utilities_ below the surfaces of a travel way of the vehicle, for recording of the subsurface layer interfaces and utilities and anomalies below the travel way as surfaces of a travel way bed, and supports, culverts and infrastructure under the travel way in relation to position of the vehicle along the travel way.

10. The system of claim 9, further comprising step frequency inputs to the GPR array.

11. The system of claim 4, wherein the scanning laser rotates and scans 360° in a plane normal to a longitudinal axis of the platform.

12. Travel way measurement method, comprising providing a vehicle, providing an inertial navigation unit (INU) mounted on the vehicle, sensing heading, pitch and roll of the vehicle with the INU, providing a computer mounted in the vehicle for recording heading, pitch and roll information from the INU, providing distance measuring instruments (DMI) connected to the vehicle, providing distance information from the DMI to the computer, providing side lasers and sensors mounted on sides of the vehicle, providing distances to a pavement from the side lasers and sensors to the computer, sensing and recording heights of the sides of the vehicle above a surface of a travel way, providing front and rear lasers and sensors mounted on the vehicle and providing distances from the front and rear lasers and sensors to the computer for measuring front and rear heights of the vehicle above the surface, providing a scanning laser mounted on the vehicle for scanning around, over, adjacent to and away from the vehicle, sensing range and angular position information relative to the scanning laser and to the vehicle of objects along, over, on and adjacent to and away from the travel way, and providing the range and angular information and reflective signal strength to the computer, whereby the computer determines and records precise locations of the vehicle along the travel way, precise positions of the vehicle in the travel way, and precise slopes, grades and surface and subsurface conditions of the travel way, and adapted for detecting edge of pavement, roadside profile, edge drop-off, shoulder, curbs, sidewalk, guardrails, roadside features, driveways, drainage facilities, pavement distress, vertical clearance, overhead features, surface roughness, and adapted for providing location referenced outputs of cross sections, visualizations, simulations, plan and elevation drawings, data for software, and 2D and 3D rendering.

13. The method of claim 12, further comprising determining objects and measurements of the objects along, over, on, adjacent to and away from the travel way using information from the scanner in the computer.

14. The method of claim 12, further comprising rotating the scanning laser 360° in a plane normal to a longitudinal axis of the vehicle.

15. The method of claim 12, further comprising providing a ground penetrating radar (GPR) array on the vehicle, triggering the GPR array with the DMI, providing information from the DMI and the GPR array to the computing device, providing to the GPR computing device information of a position of the vehicle of depths of layered surface interfaces below the surface of the travel way, and analyzing with the computing device the layered surface interfaces below the travel way as surfaces of a travel way bed, utilities, anomalies, culverts, bridges and infrastructure under the travel way.

16. The method of claim 12, further comprising providing selective multispectral infrared cameras (MIC) on the vehicle, providing information from the MIC to the computer, and measuring and recording pavement thermal emissivity in the computer.

17. The method of claim 12, further comprising providing a side mounted camera on the vehicle, providing a display visually accessible to a driver, and providing on the display an image of edge of travel way and for edge of travel way position measurement.

18. The travel way measurement method of claim 12, further comprising providing mounting one or more cameras on a platform, providing a sequence of one or more monoscopic images in each camera, or stereoscope images in one or more pairs of cameras or in multiple cameras included in the system, acquiring a set of synchronized images tagging each image with attitude and position information of the platform using the attitude and position information and reconstructing 3-D geometry of all relevant features of interest in the field of view using principles including photogrammetry, holography or other imaging techniques.

19. The method of claim 18, further comprising fusing the reconstructed imaging with a scanning output from a scanning laser system and vehicle trajectory for redundancy.

20. A travel way bed subsurface measurement method, comprising providing a motorized travel way vehicle, providing a ground penetrating radar (GPR) array on the vehicle, providing a distance measuring instrument (DMI) on the vehicle, providing a computing device on the vehicle, connecting the DMI and the GPR array to the computing device, providing longitudinal travel information of the vehicle position by the DMI, providing continuous information of positions of a surface and of subsurface layer interfaces below the surface of a travel way of the vehicle, analyzing and recording of subsurface layer interfaces below the travel way as surfaces of a travel way bed, and supports, culverts, bridges or infrastructure under the travel way in relation to position of the vehicle along the travel way.

21. The method of claim 20, further comprising providing step frequency inputs to the GPR array.

22. A travel way measurement system comprising a ring laser gyroscope (RLG) based inertial navigation unit (INU), a scanning laser, pitch reference lasers on front and rear, cross slope reference lasers on left and right side, forward looking cameras for stereoscopic imaging, step frequency ground penetrating radar (SF GPR) array, a GPS (nationwide differential or high accuracy nationwide differential) and distance measuring instruments (DMI) for determining three dimensional reconstruction of a travel way surface, alongside, above, and below the travel way surface, wherein the RLG INU and pitch reference lasers on front and rear are provided for determining travel way surface grade and location relative to the vehicle and the travel way, the scanning laser reflective signal strength provides recognition of surface lane markings, the scanning laser provides input for measuring lane wander position within a travel lane relative to vehicle trajectory and lane width for three-dimensional reconstruction of the travel way, the scanning laser provides travel way surface, side, and above travel way surface feature recognition, feature dimensions, and three-dimensional location relative to the vehicle and the travel way, the scanning laser provides_above travel way surface vertical clearance measurement and location relative to the vehicle and the travel way, and the scanning laser provides longitudinal construction based on successively recognized features and their location in two dimensions on a horizontal plane for further two-dimensional feature pattern recognition within the three dimensional measurements of the system, and adapted for detecting edge of pavement, roadside profile, edge drop-off, shoulder, curbs, sidewalk, guardrails, roadside features, driveways, drainage facilities, pavement distress, vertical clearance, overhead features, surface roughness, and adapted for providing location referenced outputs of cross sections, visualizations, simulations, plan and elevation drawings, data for software, and 2D and 3D rendering.

23. The system of claim 22, wherein the cameras are video cameras, and the video cameras provide monoscopic and stereoscopic video image inputs for measurement of lane wander and width where pavement lane markings, longitudinal pavement joints, seams or other recognizable longitudinal features are present, and provide monoscopic video image processing of an image single horizontal scan line method for measurement of lane wander and width where pavement lane markings or longitudinal concrete pavement joints are present, and providing stereoscopic imaging of travel way features providing location referencing relative to vehicle and synchronized to the three dimensional construction of the travel way.

24. The system of claim 22, further comprising providing three-dimensional reconstruction, a travel surface including horizontal alignment, vertical alignment, and travel surface cross slope, three-dimensional reconstruction of a travel wayside including roadside profile and roadside features, inertial profiling for ride quality measurements using the three-dimensional reconstruction of the travel surface, and within wheel path macrotexture/inertial profile height measurement lasers for vertical profile.

25. The system of claim 23, further comprising providing common mid-point (CMP) implementation for dielectric material calibration using alternating pairs of antennas and multiple frequency emissions of a SF GPR antenna array statically or when the vehicle is moving at up to highway speeds, providing subsurface dimensional measurement and material determination and subsurface feature recognition and orientation and subsurface layer interfaces using a SF GPR antenna array for three-dimensional continuous reconstruction of the travel way subsurface.

26. The system of claim 23, further providing the SF GPR antenna array data preprocessing in preparation for application of modified GPR processing techniques, providing subsurface feature three-dimensional reconstruction below a travel way surface relative to the vehicle and the travel way using adjacent SF GPR scans and the travel way measurement system three-dimensional reconstruction of the travel way, and providing a SF GPR DMI encoder output additional to a primary travel way measurement system computer for time and distance synchronization with other travel way measurement system sensors.

27. The system of claim 23, further comprising providing SF GPR height reference laser for dynamic height calibration of dielectric property measurements, providing travel way surface thermal emissivity measurement with three dimensional location relative to travel way measurement system vehicle and the travel way, and providing a side mounted camera connected to the vehicle and a display for edge of travel way position relative to a vehicle positioning and guidance in harsh travel way alignment environments for data quality control/assurance.

28. The system of claim 22, wherein the (RLG) (INU) is a FAA RNP-10 capable Ring Laser Gyroscope or better based INU.

* * * * *